US012525377B2

(12) United States Patent
Tanaka

(10) Patent No.: US 12,525,377 B2
(45) Date of Patent: Jan. 13, 2026

(54) CHIP RESISTOR AND METHOD OF MANUFACTURING THE SAME

(71) Applicant: ROHM CO., LTD., Kyoto (JP)

(72) Inventor: Kosaku Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 384 days.

(21) Appl. No.: 18/245,485

(22) PCT Filed: Sep. 22, 2021

(86) PCT No.: PCT/JP2021/034732
§ 371 (c)(1),
(2) Date: Mar. 15, 2023

(87) PCT Pub. No.: WO2022/091643
PCT Pub. Date: May 5, 2022

(65) Prior Publication Data

US 2023/0343492 A1 Oct. 26, 2023

(30) Foreign Application Priority Data

Nov. 2, 2020 (JP) ................................ 2020-183490

(51) Int. Cl.
*H01C 1/14* (2006.01)
*H01C 7/00* (2006.01)
*H01C 17/28* (2006.01)

(52) U.S. Cl.
CPC ................ *H01C 1/14* (2013.01); *H01C 7/00* (2013.01); *H01C 17/288* (2013.01)

(58) Field of Classification Search
CPC ........... H01C 1/14; H01C 7/00; H01C 17/288
See application file for complete search history.

(56) References Cited

U.S. PATENT DOCUMENTS 7,326,999 B2 * 2/2008 Tsukada .................. H01C 1/14 338/251
8,081,059 B2 * 12/2011 Tanimura ............... H01C 7/003 338/307

(Continued)

FOREIGN PATENT DOCUMENTS

JP 2005-277019 A 10/2005
JP 2012-199579 A 10/2012

(Continued)

OTHER PUBLICATIONS

International Search Report of PCT/JP2021/034732, dated Dec. 14, 2021 and English Translation thereof, 5 pages.

(Continued)

*Primary Examiner* — Kyung S Lee
(74) *Attorney, Agent, or Firm* — HSML P.C.

(57) ABSTRACT

A chip resistor includes a resistive element, a first conductive underlying layer, a second conductive underlying layer, a first electrode, and a second electrode. The first electrode includes a first electrode layer. The second electrode includes a second electrode layer. A first electrical resistivity of the first conductive underlying layer is higher than a second electrical resistivity of the first electrode layer and higher than a third electrical resistivity of the resistive element. A fourth electrical resistivity of the second conductive underlying layer is higher than a fifth electrical resistivity of the second electrode layer and higher than the third electrical resistivity of the resistive element.

17 Claims, 18 Drawing Sheets

(56) References Cited

U.S. PATENT DOCUMENTS

| | | | | |
|---|---|---|---|---|
| 9,251,936 | B2 * | 2/2016 | Smith | H01C 1/142 |
| 2010/0117783 | A1 | 5/2010 | Tanimura et al. | |
| 2010/0176913 | A1 | 7/2010 | Hirano et al. | |
| 2019/0227104 | A1 | 7/2019 | Nakamura et al. | |

FOREIGN PATENT DOCUMENTS

| | | |
|---|---|---|
| JP | 2013-089855 A | 5/2013 |
| JP | 2018-004267 A | 1/2018 |

OTHER PUBLICATIONS

Written Opinion for PCT/JP2021/034732 dated Dec. 14, 2021 and English Translation thereof, 5 pages.

Office Action issued in counterpart Japanese Patent Application No. 2022-558918, Aug. 12, 2025, 9 pages w/translation.

* cited by examiner

CHIP RESISTOR AND METHOD OF MANUFACTURING THE SAME

TECHNICAL FIELD

The present disclosure relates to a chip resistor and a method of manufacturing the same.

BACKGROUND ART

Japanese Patent Laying-Open No. 2018-4267 (PTL 1) discloses a shunt resistor including a resistive element, a first electrode, and a second electrode. The first electrode covers one end of the resistive element. The second electrode covers the other end of the resistive element opposite to the one end of the resistive element. The first electrode and the second electrode are distant from each other.

CITATION LIST

Patent Literature

PTL 1: Japanese Patent Laying-Open No. 2018-4267

SUMMARY OF INVENTION

Technical Problem

A resistance value of the shunt resistor described in PTL 1 is determined by an electrical resistivity of the resistive element, a cross-sectional area of the resistive element, and an interval between the first electrode and the second electrode. When an area of the first electrode and the second electrode is increased to improve heat radiation performance of the shunt resistor described in PTL 1, the interval between the first electrode and the second electrode decreases and the resistance value of the shunt resistor is varied from a designed resistance value. The present disclosure was made in view of the problem above, and an object thereof is to provide a chip resistor that achieves improved heat radiation performance independently of a resistance value.

Solution to Problem

A chip resistor in the present disclosure includes a resistive element, a first conductive underlying layer, a second conductive underlying layer, a first electrode, and a second electrode. The resistive element includes a first main surface, a second main surface opposite to the first main surface, a first side surface connected to the first main surface and the second main surface, and a second side surface opposite to the first side surface. The second side surface is connected to the first main surface and the second main surface. The first conductive underlying layer is provided on the first main surface of the resistive element. The second conductive underlying layer is provided on the first main surface of the resistive element and distant from the first conductive underlying layer. The first electrode is provided on a first side surface side of the resistive element and distant from the second conductive underlying layer. The second electrode is provided on a second side surface side of the resistive element and distant from the first conductive underlying layer and the first electrode. The first electrode includes a first electrode layer provided on the first main surface of the resistive element and the first conductive underlying layer. The second electrode includes a second electrode layer provided on the first main surface of the resistive element and the second conductive underlying layer. A first electrical resistivity of the first conductive underlying layer is higher than a second electrical resistivity of the first electrode layer and higher than a third electrical resistivity of the resistive element. A fourth electrical resistivity of the second conductive underlying layer is higher than a fifth electrical resistivity of the second electrode layer and higher than the third electrical resistivity of the resistive element.

A method of manufacturing a chip resistor in the present disclosure includes forming on a first main surface of a band-shaped resistive element, a first conductive underlying layer and a second conductive underlying layer distant from the first conductive underlying layer, forming a first conductive film on the first conductive underlying layer, the second conductive underlying layer, and a portion of the first main surface exposed from the first conductive underlying layer and the second conductive underlying layer, and dividing the band-shaped resistive element to form a resistive element including a first side surface and a second side surface. As a result of division of the band-shaped resistive element, the first conductive film is divided into a first electrode layer proximate to the first side surface and a second electrode layer proximate to the second side surface and distant from the first electrode layer. A first electrical resistivity of the first conductive underlying layer is higher than a second electrical resistivity of the first electrode layer and higher than a third electrical resistivity of the resistive element. A fourth electrical resistivity of the second conductive underlying layer is higher than a fifth electrical resistivity of the second electrode layer and higher than the third electrical resistivity of the resistive element.

Advantageous Effects of Invention

According to the chip resistor in the present disclosure, heat radiation performance of a chip resistor can be improved independently of a resistance value thereof. According to the method of manufacturing a chip resistor in the present disclosure, a chip resistor that achieves improved heat radiation performance independently of a resistance value thereof can be obtained.

DESCRIPTION OF EMBODIMENTS

Figure 1:
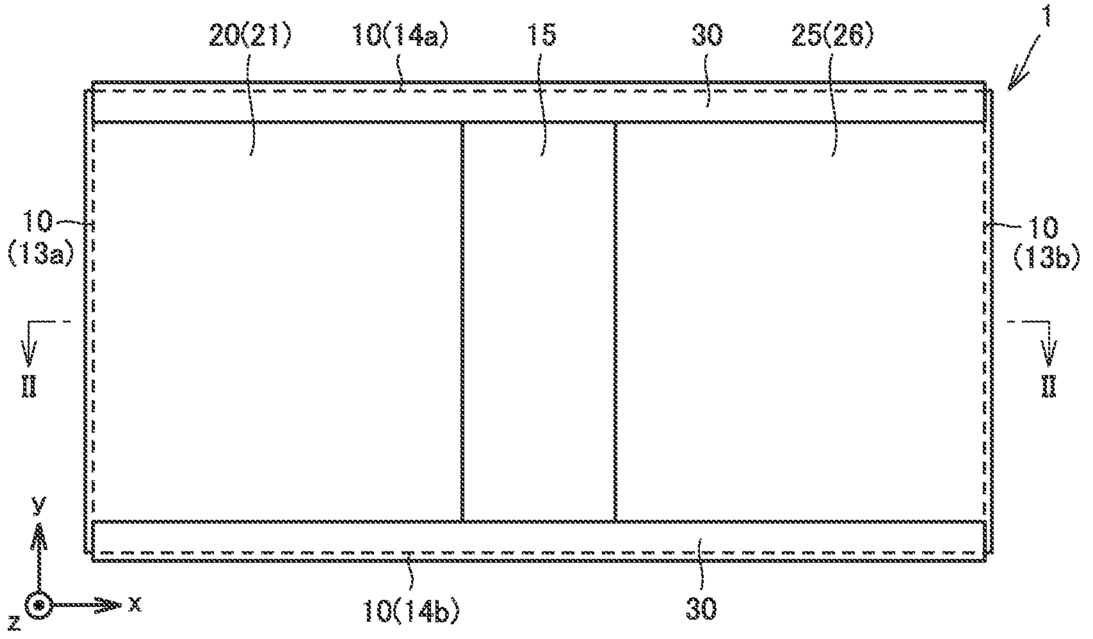
FIG. 1 is a schematic bottom view of a chip resistor in a first embodiment.

An embodiment will be described below. Identical features have identical reference characters allotted and description thereof will not be repeated.

First Embodiment

Figure 2:
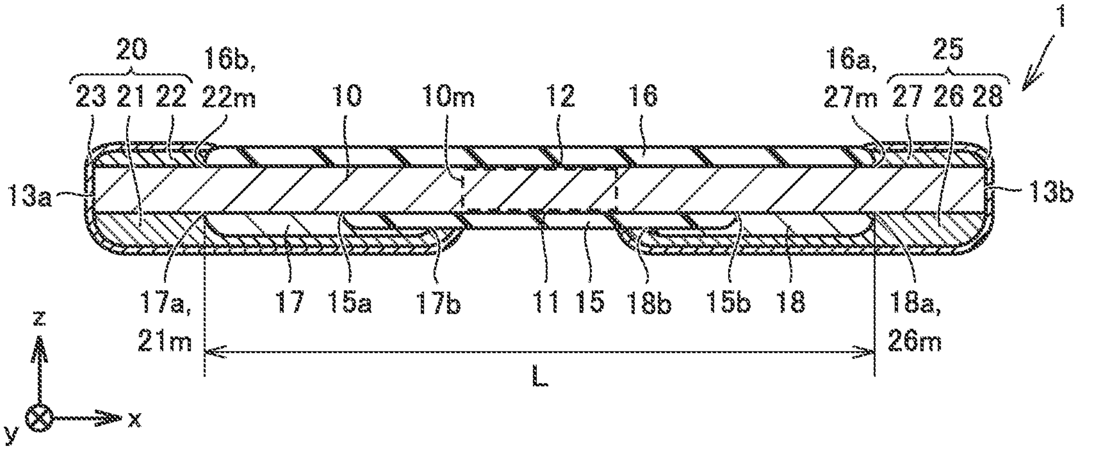
FIG. 2 is a schematic cross-sectional view along a section line II-II shown in FIG. 1, of the chip resistor in the first embodiment.

A chip resistor in a first embodiment will be described with reference to FIGS. 1 and 2. Chip resistor 1 is, for example, a chip resistor suitable for detection of a current. Chip resistor 1 is, for example, a shunt resistor. Chip resistor 1 includes a resistive element 10, a first conductive underlying layer 17, a second conductive underlying layer 18, a first electrode 20, and a second electrode 25. Chip resistor 1 may further include a first insulating layer 15, a second insulating layer 16, and an insulating coating film 30.

Resistive element 10 is formed, for example, of an electrically resistive material such as a Cu—Mn alloy, a Cu—Ni alloy, or an Ni—Cr alloy. Resistive element 10 includes a first main surface 11, a second main surface 12 opposite to first main surface 11, a first side surface 13*a*, a second side surface 13*b* opposite to first side surface 13*a*, a third side surface 14*a*, and a fourth side surface 14*b* opposite to third side surface 14*a*. First main surface 11 and second main surface 12 each extend in a first direction (an x direction) and a second direction (a y direction) perpendicular to the first direction (the x direction). For example, a longitudinal direction of resistive element 10 is defined as the first direction (the x direction). For example, a direction of a short side of resistive element 10 is defined as the second direction (the y direction). First main surface 11 and second main surface 12 are distant from each other in a third direction (a z direction) perpendicular to the first direction (the x direction) and the second direction (the y direction). A direction of thickness of resistive element 10 is defined as the third direction (the z direction). In mount of chip resistor 1 on a circuit board 50 (see FIG. 3), first main surface 11 of resistive element 10 faces circuit board 50.

First side surface 13*a* is connected to first main surface 11 and second main surface 12. Second side surface 13*b* is connected to first main surface 11 and second main surface 12. First side surface 13*a* and second side surface 13*b* are distant from each other in the first direction (the x direction). Third side surface 14*a* is connected to first main surface 11 and second main surface 12 and connected to first side surface 13*a* and second side surface 13*b*. Fourth side surface 14*b* is connected to first main surface 11 and second main surface 12 and connected to first side surface 13*a* and second side surface 13*b*. Third side surface 14*a* and fourth side surface 14*b* are distant from each other in the second direction (the y direction). Resistive element 10 includes a central portion 10*m* exposed from first electrode 20 and second electrode 25 in a plan view of first main surface 11. Central portion 10*m* is arranged between first electrode 20 and second electrode 25 in the first direction (the x direction).

First insulating layer 15 is provided on first main surface 11 of resistive element 10. First insulating layer 15 is arranged between first electrode 20 and second electrode 25 and spaces first electrode 20 and second electrode 25 away from each other. First insulating layer 15 is arranged between a first electrode layer 21 and a second electrode layer 26 and spaces first electrode layer 21 and second electrode layer 26 away from each other. First insulating layer 15 is arranged between first conductive underlying layer 17 and second conductive underlying layer 18 and spaces first conductive underlying layer 17 and second conductive underlying layer 18 away from each other. First insulating layer 15 is formed on central portion 10*m* of resistive element 10. First insulating layer 15 protects resistive element 10. First insulating layer 15 includes a first end 15*a* proximate to first side surface 13*a* of resistive element 10 and a second end 15*b* proximate to second side surface 13*b* of resistive element 10. First insulating layer 15 is formed of an insulating resin such as an epoxy resin.

Second insulating layer 16 is provided on second main surface 12 of resistive element 10. Second insulating layer 16 is arranged between first electrode 20 and second electrode 25 and spaces first electrode 20 and second electrode 25 away from each other. Second insulating layer 16 is arranged between a third electrode layer 22 and a fourth electrode layer 27 and spaces third electrode layer 22 and fourth electrode layer 27 away from each other. Second insulating layer 16 is formed on central portion 10*m* of resistive element 10. Second insulating layer 16 protects resistive element 10. Second insulating layer 16 includes a third end 16*a* proximate to second side surface 13*b* of resistive element 10 and a fourth end 16*b* proximate to first side surface 13*a* of resistive element 10. Third end 16*a* of second insulating layer 16 may be in contact with fourth electrode layer 27. Fourth end 16*b* of second insulating layer 16 may be in contact with third electrode layer 22. Second insulating layer 16 is formed of an insulating resin such as an epoxy resin.

Insulating coating film 30 covers third side surface 14*a* of resistive element 10, fourth side surface 14*b* of resistive element 10, a first band-shaped region in first main surface 11 of resistive element 10 that is proximate to third side surface 14*a*, a second band-shaped region in first main surface 11 of resistive element 10 that is proximate to fourth side surface 14*b*, a third band-shaped region in second main surface 12 of resistive element 10 that is proximate to third side surface 14*a*, and a fourth band-shaped region in second main surface 12 of resistive element 10 that is proximate to fourth side surface 14*b*. Longitudinal directions of the first band-shaped region, the second band-shaped region, the third band-shaped region, and the fourth band-shaped region are defined as the first direction (the x direction). Insulating coating film 30 protects resistive element 10. Insulating coating film 30 is formed of an insulating resin such as an epoxy resin.

First conductive underlying layer 17 is provided on first main surface 11 of resistive element 10. First conductive underlying layer 17 is formed on a region in first main surface 11 of resistive element 10, that is proximate to first side surface 13*a* of resistive element 10 with respect to central portion 10*m* of resistive element 10. First conductive underlying layer 17 includes an end 17*a* proximate to first side surface 13*a* of resistive element 10 and an end 17*b* proximate to central portion 10*m* of resistive element 10. First conductive underlying layer 17 is provided also on first insulating layer 15. First end 15*a* of first insulating layer 15 is covered with first conductive underlying layer 17. End 17*b* of first conductive underlying layer 17 is exposed from first insulating layer 15. Ends 17*a* and 17*b* of first conductive underlying layer 17 are covered with first electrode layer 21. First conductive underlying layer 17 is formed, for example, of a conductive resin containing a binder resin (for example, an epoxy resin, a phenol resin, or a polyimide resin) and conductive particles (for example, silver particles) dispersed in the binder resin.

A first electrical resistivity of first conductive underlying layer 17 is higher than a second electrical resistivity of first electrode layer 21 and higher than a third electrical resistivity of resistive element 10. Therefore, while a current flows through chip resistor 1, substantially no current flows through first conductive underlying layer 17. First conductive underlying layer 17 does not substantially vary a resistance value of chip resistor 1.

The first electrical resistivity of first conductive underlying layer 17 is, for example, at least ten times as high as the second electrical resistivity of first electrode layer 21. The first electrical resistivity of first conductive underlying layer 17 may be at least twenty times, at least fifty times, or at least one hundred times as high as the second electrical resistivity of first electrode layer 21. The first electrical resistivity of first conductive underlying layer 17 is, for example, at least five times as high as the third electrical resistivity of resistive element 10. The first electrical resistivity of first conductive underlying layer 17 may be at least ten times, at least twenty-five times, or at least fifty times as high as the third electrical resistivity of resistive element 10.

Second conductive underlying layer 18 is provided on first main surface 11 of resistive element 10. Second conductive underlying layer 18 is formed on a region in first main surface 11 of resistive element 10, that is proximate to second side surface 13*b* of resistive element 10 with respect to central portion 10*m* of resistive element 10. Second conductive underlying layer 18 includes an end 18*a* proximate to second side surface 13*b* of resistive element 10 and an end 18*b* proximate to central portion 10*m* of resistive element 10. Second conductive underlying layer 18 is provided also on first insulating layer 15. Second end 15*b* of first insulating layer 15 is covered with second conductive underlying layer 18. End 18*b* of second conductive underlying layer 18 is exposed from first insulating layer 15. Ends 18*a* and 18*b* of second conductive underlying layer 18 are covered with second electrode layer 26. Second conductive underlying layer 18 is distant from first conductive underlying layer 17 in the first direction (the x direction). Second conductive underlying layer 18 is formed, for example, of a conductive resin containing a binder resin (for example, an epoxy resin, a phenol resin, or a polyimide resin) and conductive particles (for example, silver particles) dispersed in the binder resin.

A fourth electrical resistivity of second conductive underlying layer 18 is higher than a fifth electrical resistivity of second electrode layer 26 and higher than the third electrical resistivity of resistive element 10. Therefore, while a current flows through chip resistor 1, substantially no current flows through second conductive underlying layer 18. Second conductive underlying layer 18 does not substantially vary a resistance value of chip resistor 1.

The fourth electrical resistivity of second conductive underlying layer 18 is, for example, at least ten times as high as the fifth electrical resistivity of second electrode layer 26. The fourth electrical resistivity of second conductive underlying layer 18 may be at least twenty times, at least fifty times, or at least one hundred times as high as the fifth electrical resistivity of second electrode layer 26. The fourth electrical resistivity of second conductive underlying layer 18 is, for example, at least five times as high as the third electrical resistivity of resistive element 10. The fourth electrical resistivity of second conductive underlying layer 18 may be at least ten times, at least twenty-five times, or at least fifty times as high as the third electrical resistivity of resistive element 10.

First electrode 20 is provided on a first side surface 13*a* side of resistive element 10. First electrode 20 is proximate to first side surface 13*a* of resistive element 10 with respect to central portion 10*m* of resistive element 10 in the first direction (the x direction). First electrode 20 extends along first side surface 13*a* of resistive element 10. First electrode 20 is distant from second conductive underlying layer 18 and second electrode 25 in the first direction (the x direction). First electrode 20 includes first electrode layer 21, third electrode layer 22, and a first thin metal layer 23.

First electrode layer 21 is provided on first main surface 11 of resistive element 10 and first conductive underlying layer 17. First electrode layer 21 is proximate to first side surface 13*a* of resistive element 10 and extends along first side surface 13*a* of resistive element 10. In the plan view of first main surface 11 or second main surface 12, a first portion 21*m* of first electrode layer 21 that is in contact with resistive element 10 and most proximate to central portion 10*m* of resistive element 10 is more proximate to central portion 10*m* of resistive element 10 than a third portion 22*m* of third electrode layer 22 that is in contact with resistive element 10 and most proximate to central portion 10*m* of resistive element 10 or flush with third portion 22*m* of third electrode layer 22.

A thickness of first electrode layer 21 on first conductive underlying layer 17 is much smaller than the thickness of first electrode layer 21 on first main surface 11 of resistive element 10. The thickness of first electrode layer 21 on first conductive underlying layer 17 is, for example, at most 0.1 time as large as the thickness of first electrode layer 21 on first main surface 11 of resistive element 10. The second electrical resistivity of first electrode layer 21 is lower than the third electrical resistivity of resistive element 10. First electrode layer 21 is formed, for example, of a metal such as copper. First electrode layer 21 is, for example, a plated layer.

Third electrode layer 22 is provided on second main surface 12 of resistive element 10. A ninth electrical resistivity of third electrode layer 22 is lower than the third electrical resistivity of resistive element 10. Third electrode layer 22 is formed, for example, of a metal such as copper. Third electrode layer 22 is, for example, a plated layer.

First thin metal layer 23 electrically connects first electrode layer 21 and third electrode layer 22 to each other. First thin metal layer 23 covers first electrode layer 21, third electrode layer 22, and first side surface 13*a* of resistive element 10. First thin metal layer 23 is formed of a conductive material containing tin such as a solder layer. First thin metal layer 23 is, for example, a plated layer.

Second electrode 25 is provided on a second side surface 13*b* side of resistive element 10. Second electrode 25 is proximate to second side surface 13*b* of resistive element 10 with respect to central portion 10*m* of resistive element 10 in the first direction (the x direction). Second electrode 25 extends along second side surface 13*b* of resistive element 10. Second electrode 25 is distant from first conductive underlying layer 17 and first electrode 20 in the first direction (the x direction). Second electrode 25 includes second electrode layer 26, fourth electrode layer 27, and a second thin metal layer 28.

Second electrode layer 26 is provided on first main surface 11 of resistive element 10 and second conductive underlying layer 18. Second electrode layer 26 is proximate to second side surface 13*b* of resistive element 10 and extends along second side surface 13*b* of resistive element 10. In the plan view of first main surface 11 or second main surface 12, a second portion 26*m* of second electrode layer 26 that is in contact with resistive element 10 and most proximate to central portion 10*m* of resistive element 10 is more proximate to central portion 10*m* of resistive element 10 than a fourth portion 27*m* of fourth electrode layer 27 that is in contact with resistive element 10 and most proximate to central portion 10*m* of resistive element 10 or flush with fourth portion 27*m* of fourth electrode layer 27.

A thickness of second electrode layer 26 on second conductive underlying layer 18 is much smaller than the thickness of second electrode layer 26 on first main surface 11 of resistive element 10. The thickness of second electrode layer 26 on second conductive underlying layer 18 is, for example, at most 0.1 time as large as the thickness of second electrode layer 26 on first main surface 11 of resistive element 10. The fifth electrical resistivity of second electrode layer 26 is lower than the third electrical resistivity of resistive element 10. Second electrode layer 26 is formed, for example, of a metal such as copper. Second electrode layer 26 is, for example, a plated layer.

Fourth electrode layer 27 is provided on second main surface 12 of resistive element 10. Fourth electrode layer 27 is distant from third electrode layer 22 in the first direction (the x direction). A seventh electrical resistivity of fourth electrode layer 27 is lower than the third electrical resistivity of resistive element 10. Fourth electrode layer 27 is formed, for example, of a metal such as copper. Fourth electrode layer 27 is, for example, a plated layer.

Second thin metal layer 28 electrically connects second electrode layer 26 and fourth electrode layer 27 to each other. Second thin metal layer 28 covers second electrode layer 26, fourth electrode layer 27, and second side surface

13*b* of resistive element 10. Second thin metal layer 28 is formed of a conductive material containing tin such as a solder layer. Second thin metal layer 28 is, for example, a plated layer.

First portion 21*m* of first electrode layer 21 that is in contact with resistive element 10 and most proximate to central portion 10*m* of resistive element 10 is more proximate to central portion 10*m* of resistive element 10 than third portion 22*m* of third electrode layer 22 that is in contact with resistive element 10 and most proximate to central portion 10*m* of resistive element 10 or flush with third portion 22*m* of third electrode layer 22. Second portion 26*m* of second electrode layer 26 that is in contact with resistive element 10 and most proximate to central portion 10*m* of resistive element 10 is more proximate to central portion 10*m* of resistive element 10 than fourth portion 27*m* of fourth electrode layer 27 that is in contact with resistive element 10 and most proximate to central portion 10*m* of resistive element 10 or flush with fourth portion 27*m* of fourth electrode layer 27. Therefore, the resistance value of chip resistor 1 is dependent on a distance L (see FIG. 2) between first portion 21*m* of first electrode layer 21 and second portion 26*m* of second electrode layer 26.

In contrast, as described already, first conductive underlying layer 17 and second conductive underlying layer 18 do not substantially vary the resistance value of chip resistor 1. In other words, even when a size of first conductive underlying layer 17 and a size of second conductive underlying layer 18 vary, the resistance value of chip resistor 1 does not substantially vary unless distance L varies.

Therefore, though the resistance value of chip resistor 1 is dependent on distance L, it is not dependent on the size of first electrode 20 (first electrode layer 21) or second electrode 25 (second electrode layer 26). Heat radiation performance of chip resistor 1 can be improved independently of the resistance value of chip resistor 1.

Figure 3:
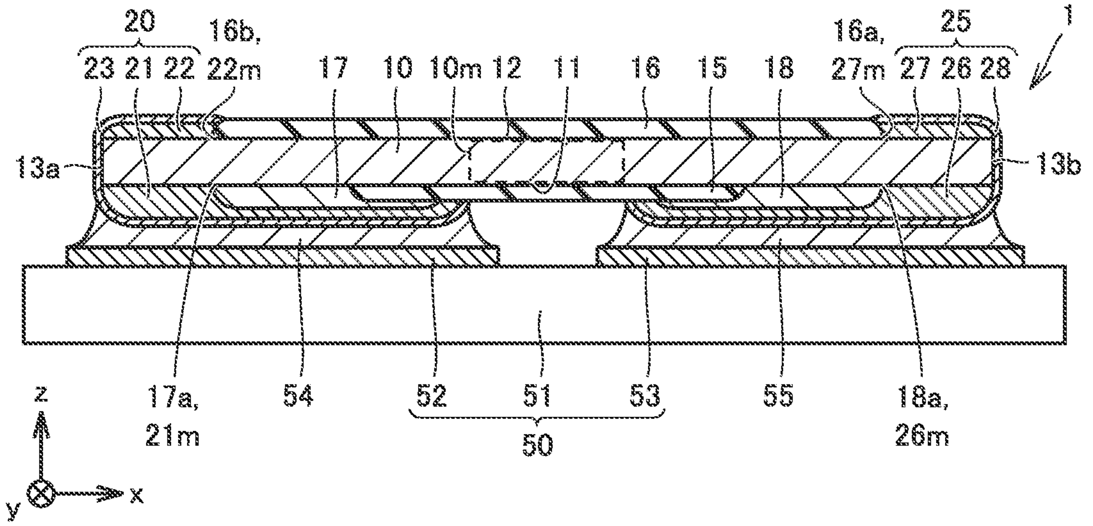
FIG. 3 is a schematic cross-sectional view of the chip resistor in the first embodiment mounted on a circuit board.

Referring to FIG. 3, chip resistor 1 is mounted, for example, on circuit board 50. Specifically, circuit board 50 includes an insulating substrate 51 and conductive wires 52 and 53. First electrode 20 of chip resistor 1 is bonded to conductive wire 52 of circuit board 50 with the use of a bonding member 54 such as solder. Second electrode 25 of chip resistor 1 is bonded to conductive wire 53 of circuit board 50 with the use of a bonding member 55 such as solder.

An exemplary method of manufacturing chip resistor 1 in the present embodiment will be described with reference to FIGS. 1 to 13.

Figure 4:
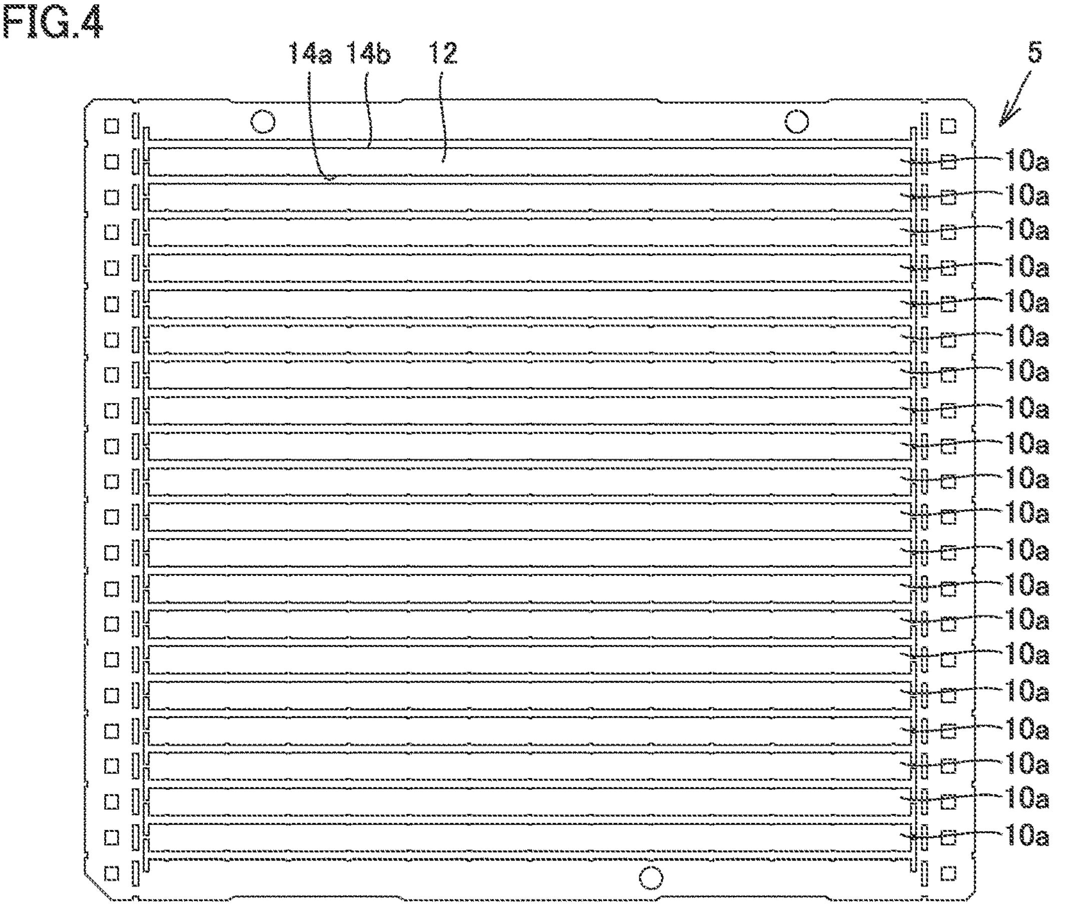
FIG. 4 is a schematic plan view showing one step in a method of manufacturing a chip resistor in first to fourth embodiments.

Referring to FIG. 4, the method of manufacturing chip resistor 1 in the present embodiment includes preparing a resistive element frame 5. Resistive element frame 5 is formed, for example, of an electrically resistive material such as a Cu—Mn alloy, a Cu—Ni alloy, or an Ni—Cr alloy. Resistive element frame 5 includes a plurality of band-shaped resistive elements 10*a*. The longitudinal direction of band-shaped resistive element 10*a* is defined as the first direction (the x direction). The plurality of band-shaped resistive elements 10*a* each include first main surface 11, second main surface 12 opposite to first main surface 11, third side surface 14*a*, and fourth side surface 14*b* opposite to third side surface 14*a*.

Figure 5:
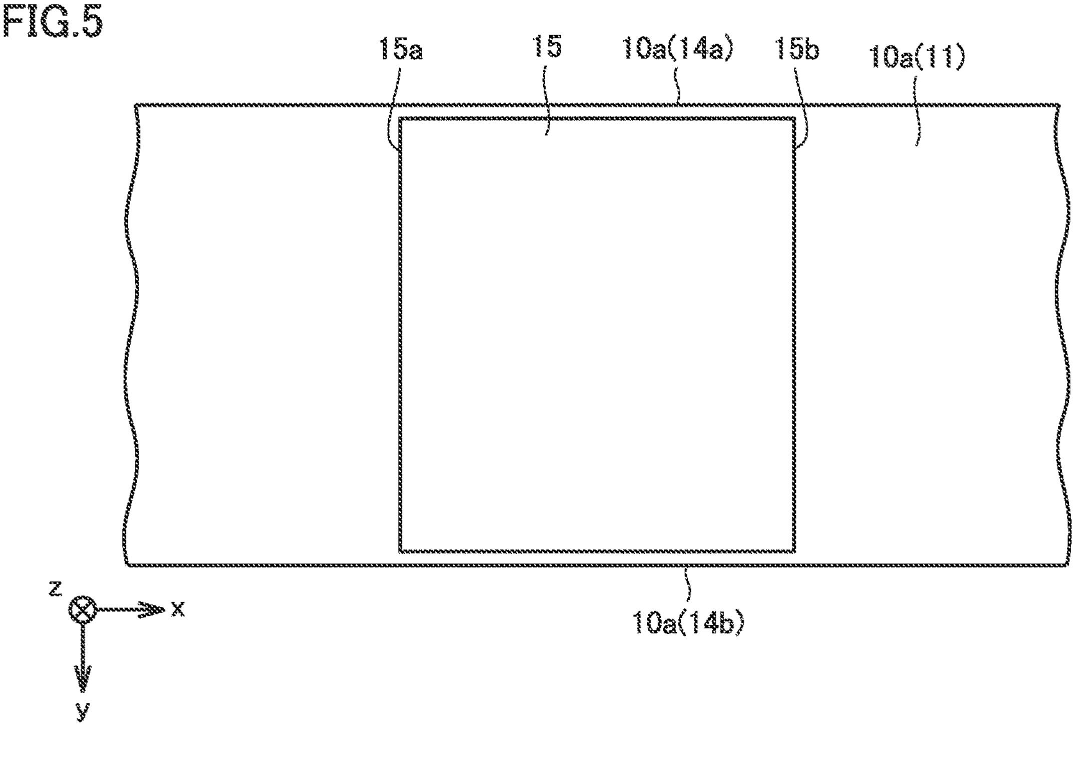
FIG. 5 is a schematic bottom view showing a step following the step shown in FIG. 4 in the method of manufacturing a chip resistor in the first to third embodiments.
Figure 6:
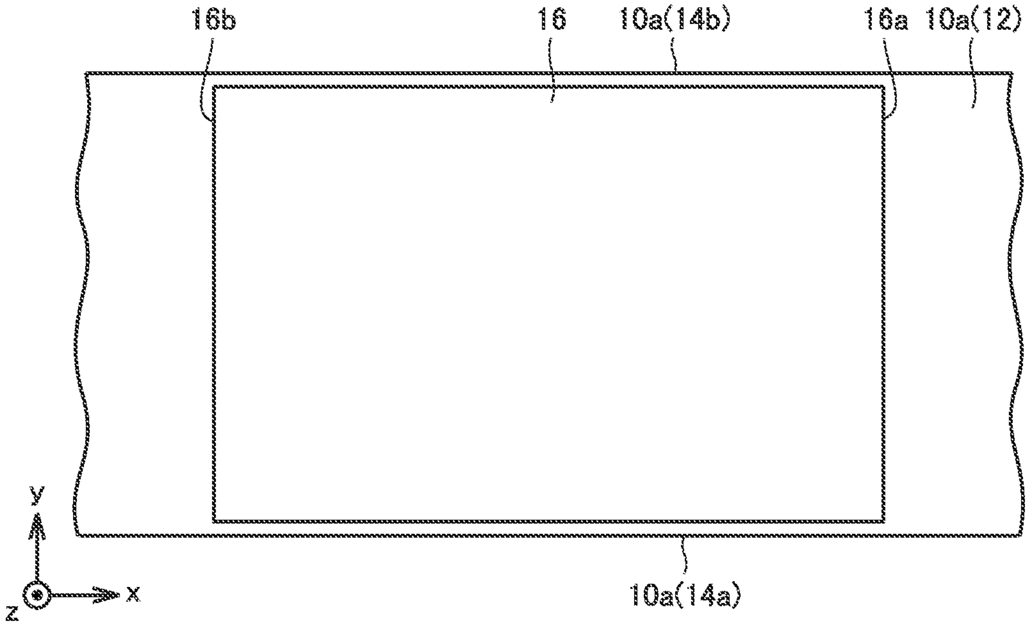
FIG. 6 is a schematic plan view showing a step following the step shown in FIG. 4 in the method of manufacturing a chip resistor in the first to third embodiments and a schematic plan view showing a step following a step shown in FIG. 28 in the method of manufacturing a chip resistor in the fourth embodiment.

Referring to FIGS. 5 and 6, the method of manufacturing chip resistor 1 in the present embodiment includes forming first insulating layer 15 on first main surface 11 of band-shaped resistive element 10*a* and forming second insulating layer 16 on second main surface 12 of band-shaped resistive element 10*a*. First insulating layer 15 includes first end 15*a* which is an end of first insulating layer 15 in the first direction (the x direction) and second end 15*b* which is an end of first insulating layer 15 in the first direction (the x direction) and opposite to first end 15*a*. Second insulating layer 16 includes third end 16*a* which is an end of second insulating layer 16 in the first direction (the x direction) and fourth end 16*b* which is an end of second insulating layer 16 in the first direction (the x direction) and opposite to third end 16*a*.

First insulating layer 15 and second insulating layer 16 are formed, for example, of an insulating resin such as an epoxy resin. First insulating layer 15 and second insulating layer 16 are provided, for example, by printing such as screen printing.

Figure 7:
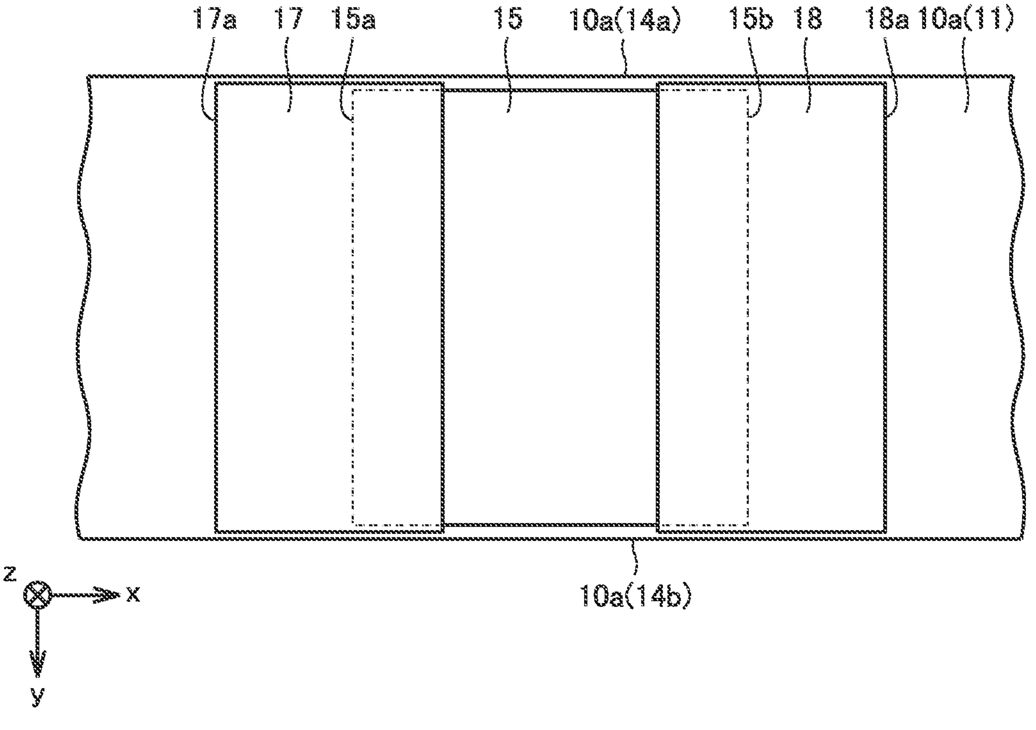
FIG. 7 is a schematic bottom view showing a step following the steps shown in FIGS. 5 and 6 in the method of manufacturing a chip resistor in the first to third embodiments.

Referring to FIG. 7, the method of manufacturing chip resistor 1 in the present embodiment includes forming first conductive underlying layer 17 and second conductive underlying layer 18 on first main surface 11 of band-shaped resistive element 10*a*. First conductive underlying layer 17 and second conductive underlying layer 18 may further be formed on first insulating layer 15. First conductive underlying layer 17 may cover first end 15*a* of first insulating layer 15. Second conductive underlying layer 18 may cover second end 15*b* of first insulating layer 15. First conductive underlying layer 17 and second conductive underlying layer 18 are distant from each other in the first direction (the x direction). First conductive underlying layer 17 and second conductive underlying layer 18 are formed, for example, of a conductive resin containing a binder resin (for example, an epoxy resin, a phenol resin, or a polyimide resin) and conductive particles (for example, silver particles) dispersed in the binder resin. First conductive underlying layer 17 and second conductive underlying layer 18 are provided, for example, by printing such as screen printing.

Figure 8:
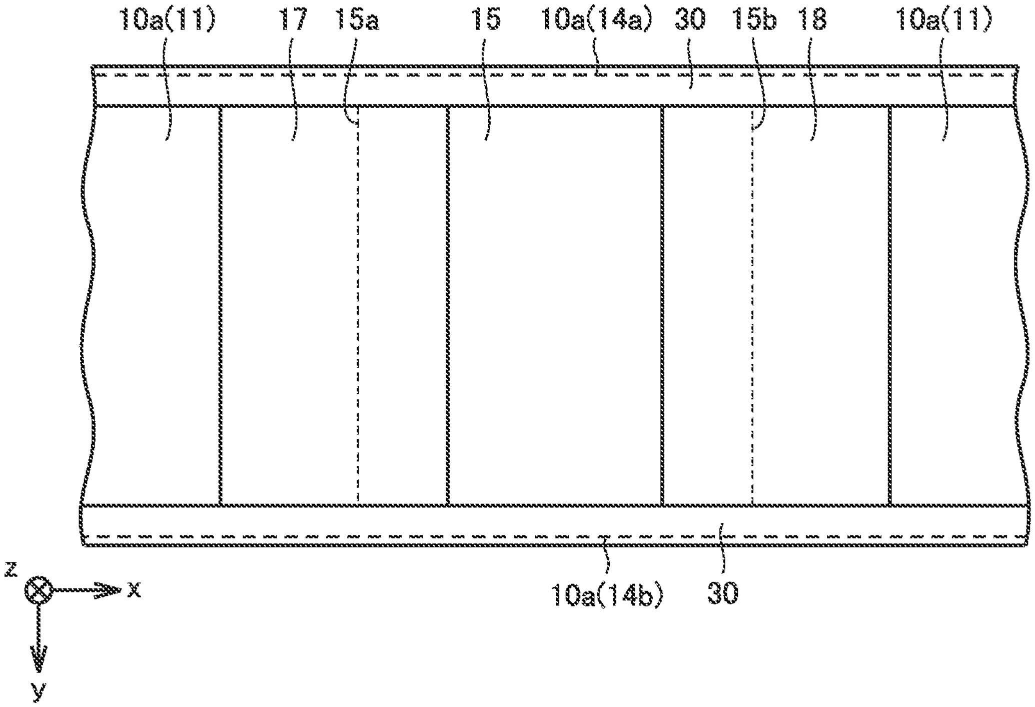
FIG. 8 is a schematic bottom view showing a step following the step shown in FIG. 7 in the method of manufacturing a chip resistor in the first embodiment, a schematic bottom view showing a step following the step shown in FIG. 17 in the method of manufacturing a chip resistor in the second embodiment, and a schematic bottom view showing a step following the step shown in FIG. 24 in the method of manufacturing a chip resistor in the third embodiment.
Figure 9:
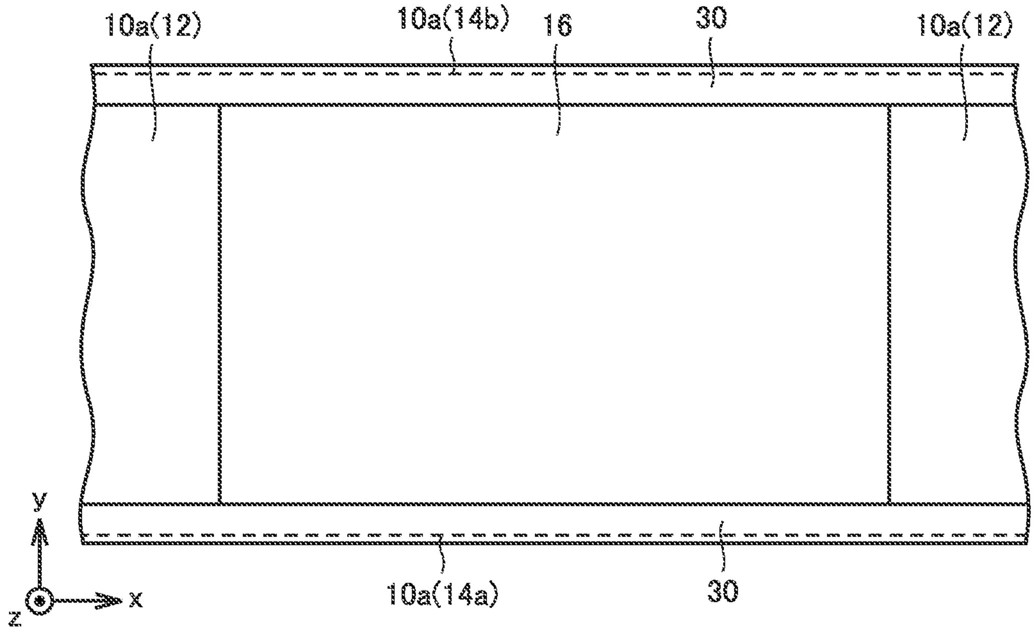
FIG. 9 is a schematic plan view showing a step following the step shown in FIG. 7 in the method of manufacturing a chip resistor in the first embodiment and a schematic bottom view showing a step following the steps shown in FIGS. 6 and 29 in the method of manufacturing a chip resistor in the fourth embodiment.

Referring to FIGS. 8 and 9, the method of manufacturing chip resistor 1 in the present embodiment includes forming insulating coating film 30. Insulating coating film 30 covers third side surface 14*a* and fourth side surface 14*b* of band-shaped resistive element 10*a*, a first band-shaped region in first main surface 11 of band-shaped resistive element 10*a* that is proximate to third side surface 14*a*, a second band-shaped region in first main surface 11 of band-shaped resistive element 10*a* that is proximate to fourth side surface 14*b*, a third band-shaped region in second main surface 12 of band-shaped resistive element 10*a* that is proximate to third side surface 14*a*, and a fourth band-shaped region in second main surface 12 of band-shaped resistive element 10*a* that is proximate to fourth side surface 14*b*. Insulating coating film 30 is formed, for example, of an insulating resin such as an epoxy resin. Insulating coating film 30 is provided, for example, by dip coating or printing.

Figure 10:
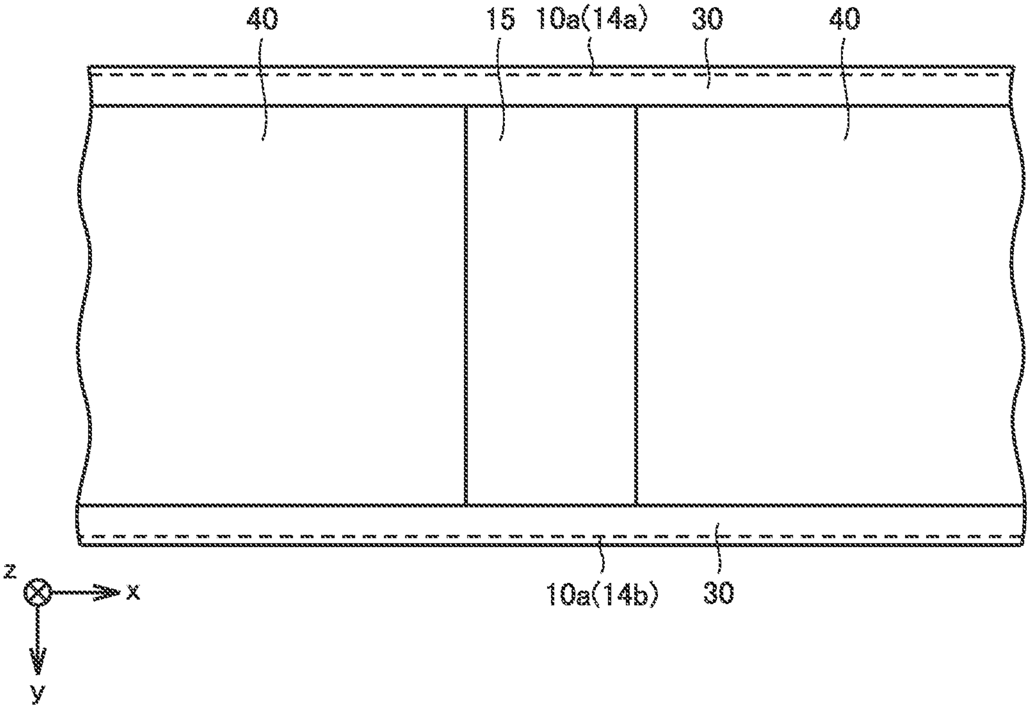
FIG. 10 is a schematic bottom view showing a step following the steps shown in FIGS. 8 and 9 in the method of manufacturing a chip resistor in the first embodiment, a schematic bottom view showing a step following the steps shown in FIGS. 8 and 18 in the method of manufacturing a chip resistor in the second embodiment, and a schematic bottom view showing a step following the steps shown in FIGS. 8 and 25 in the method of manufacturing a chip resistor in the third embodiment.
Figure 11:
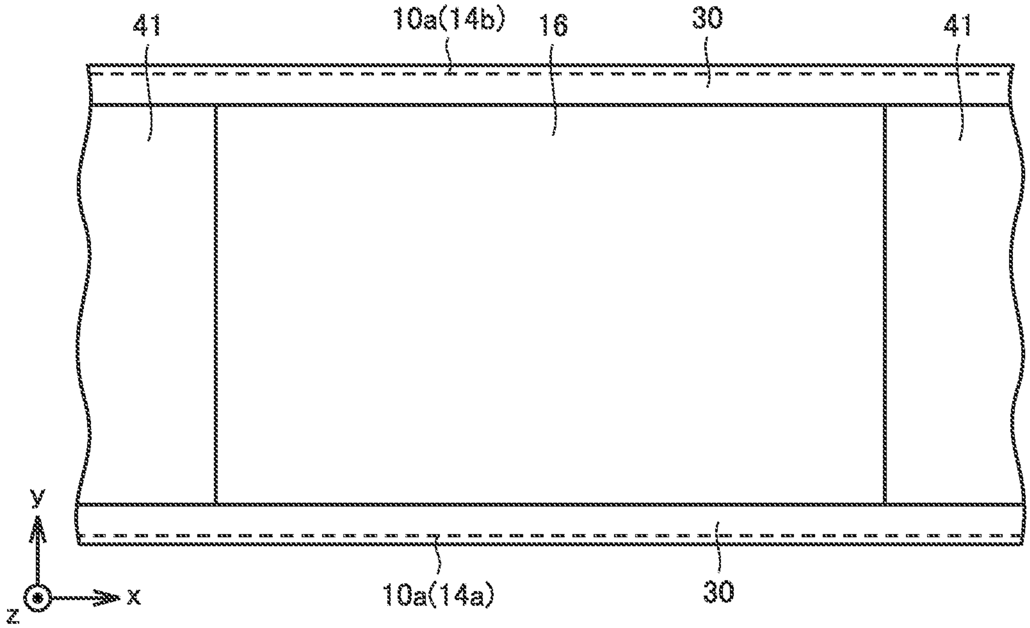
FIG. 11 is a schematic plan view showing a step following the steps shown in FIGS. 8 and 9 in the method of manufacturing a chip resistor in the first embodiment and a schematic bottom view showing a step following the steps shown in FIGS. 9 and 30 in the method of manufacturing a chip resistor in the fourth embodiment.

Referring to FIGS. 10 and 11, the method of manufacturing chip resistor 1 in the present embodiment includes forming a first conductive film 40 and a second conductive film 41. First conductive film 40 is formed on first conductive underlying layer 17, second conductive underlying layer 18, and a portion of first main surface 11 of resistive element 10 that is exposed from first insulating layer 15, insulating coating film 30, first conductive underlying layer 17, and second conductive underlying layer 18. Second conductive film 41 is formed on a portion of second main surface 12 of resistive element 10 that is exposed from second insulating layer 16 and insulating coating film 30. First conductive film 40 and second conductive film 41 are formed, for example, of a metal such as copper.

First conductive film 40 and second conductive film 41 are provided, for example, by plating. First conductive film 40 and second conductive film 41 are each, for example, a metal plated film. Resistive element 10, first conductive underlying layer 17, and second conductive underlying layer 18 are conductive, whereas first insulating layer 15, second insulating layer 16, and insulating coating film 30 are electrically insulating. Therefore, first conductive film 40 is selectively formed on first conductive underlying layer 17, second conductive underlying layer 18, and the portion of first main surface 11 of resistive element 10 that is exposed from first insulating layer 15, insulating coating film 30, first conductive underlying layer 17, and second conductive underlying layer 18. Second conductive film 41 is selectively formed on the portion of second main surface 12 of resistive element 10 that is exposed from second insulating layer 16 and insulating coating film 30.

When first conductive film 40 is formed, for example, by plating, the thickness of first conductive film 40 on first conductive underlying layer 17 becomes much smaller than the thickness of first conductive film 40 on first main surface 11 of resistive element 10 and the thickness of first conductive film 40 on second conductive underlying layer 18 becomes much smaller than the thickness of first conductive film 40 on first main surface 11 of resistive element 10.

Figure 12:
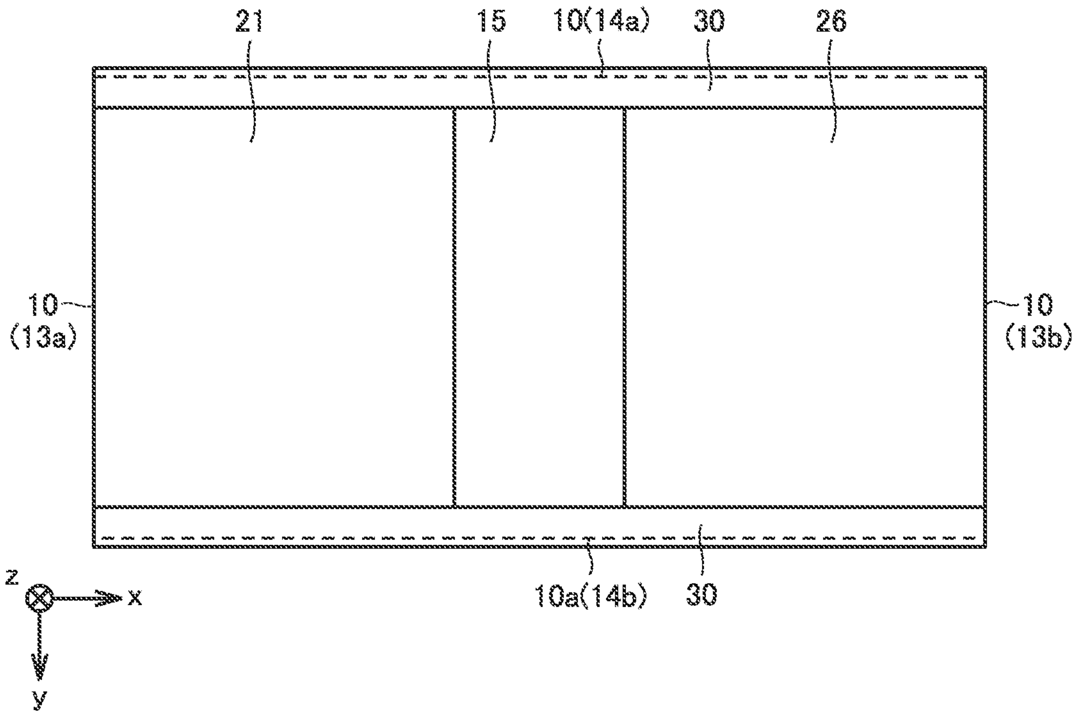
FIG. 12 is a schematic bottom view showing a step following the steps shown in FIGS. 10 and 11 in the method of manufacturing a chip resistor in the first embodiment and a schematic bottom view showing a step following the steps shown in FIGS. 10 and 19 in the method of manufacturing a chip resistor in the second and third embodiments.
Figure 13:
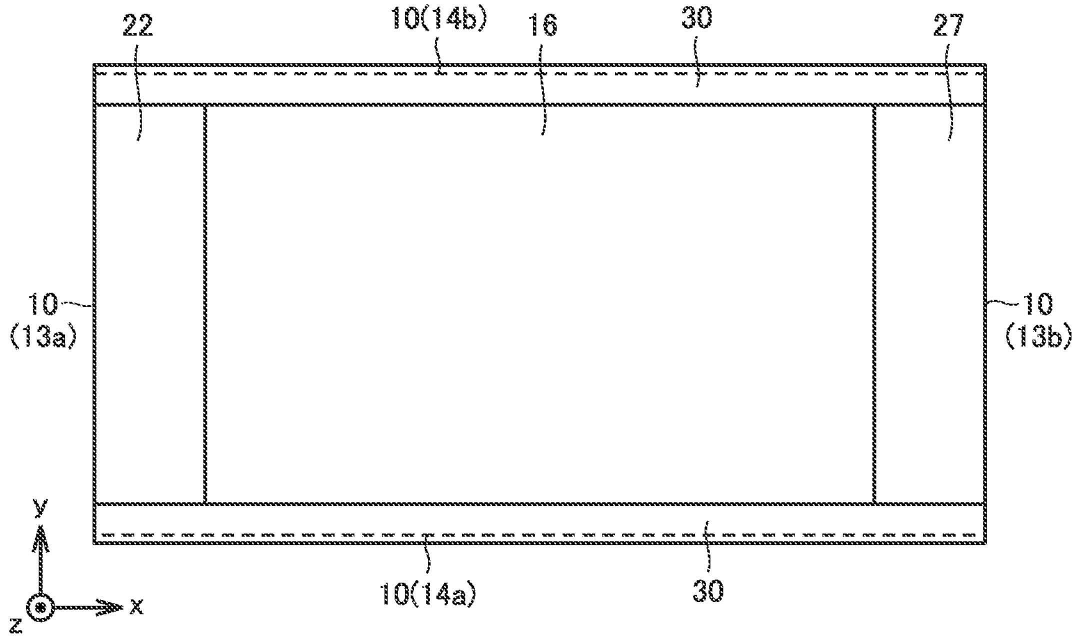
FIG. 13 is a schematic plan view showing a step following the steps shown in FIGS. 10 and 11 in the method of manufacturing a chip resistor in the first embodiment and a schematic bottom view showing a step following the steps shown in FIGS. 11 and 31 in the method of manufacturing a chip resistor in the fourth embodiment.

Referring to FIGS. 12 and 13, the method of manufacturing chip resistor 1 in the present embodiment includes dividing band-shaped resistive element 10*a* to form resistive element 10 including first side surface 13*a* and second side surface 13*b*. As a result of division of band-shaped resistive element 10*a*, first conductive film 40 is divided into first electrode layer 21 proximate to first side surface 13*a* and second electrode layer 26 proximate to second side surface 13*b*. Second electrode layer 26 is distant from first electrode layer 21 in the first direction (the x direction). As a result of division of band-shaped resistive element 10*a*, second conductive film 41 is divided into third electrode layer 22 proximate to first side surface 13*a* and fourth electrode layer 27 proximate to second side surface 13*b*. Fourth electrode layer 27 is distant from third electrode layer 22 in the first direction (the x direction).

The method of manufacturing chip resistor 1 in the present embodiment includes forming first thin metal layer 23 and second thin metal layer 28. First thin metal layer 23 electrically connects first electrode layer 21 and third electrode layer 22 to each other. First thin metal layer 23 covers first electrode layer 21, third electrode layer 22, and first side surface 13*a* of resistive element 10. Second thin metal layer 28 electrically connects second electrode layer 26 and fourth electrode layer 27 to each other. Second thin metal layer 28 covers second electrode layer 26, fourth electrode layer 27, and second side surface 13*b* of resistive element 10. First thin metal layer 23 and second thin metal layer 28 are formed, for example, of a conductive material containing tin such as a solder layer.

First thin metal layer 23 and second thin metal layer 28 are provided, for example, by plating. First thin metal layer 23 and second thin metal layer 28 are each, for example, a metal plated film. First electrode layer 21, second electrode layer 26, resistive element 10, third electrode layer 22, and fourth electrode layer 27 are conductive, whereas first insulating layer 15, second insulating layer 16, and insulating coating film 30 are electrically insulating. Therefore, first thin metal layer 23 is selectively formed on first electrode layer 21, second electrode layer 26, and first side surface 13*a* of resistive element 10. Second thin metal layer 28 is selectively formed on third electrode layer 22, fourth electrode layer 27, and second side surface 13*b* of resistive element 10. Chip resistor 1 shown in FIGS. 1 and 2 is thus obtained.

Effects of chip resistor 1 and the method of manufacturing the same in the present embodiment will be described.

Chip resistor 1 in the present embodiment includes resistive element 10, first conductive underlying layer 17, second conductive underlying layer 18, first electrode 20, and second electrode 25. Resistive element 10 includes first main surface 11, second main surface 12 opposite to first main surface 11, first side surface 13*a* connected to first main surface 11 and second main surface 12, and second side surface 13*b* opposite to first side surface 13*a*. Second side surface 13*b* is connected to first main surface 11 and second main surface 12. First conductive underlying layer 17 is provided on first main surface 11 of resistive element 10. Second conductive underlying layer 18 is provided on first main surface 11 of resistive element 10 and distant from first conductive underlying layer 17. First electrode 20 is provided on the first side surface 13*a* side of resistive element 10 and distant from second conductive underlying layer 18. Second electrode 25 is provided on the second side surface 13*b* side of resistive element 10 and distant from first conductive underlying layer 17 and first electrode 20. First electrode 20 includes first electrode layer 21 provided on first main surface 11 of resistive element 10 and first conductive underlying layer 17. Second electrode 25 includes second electrode layer 26 provided on first main surface 11 of resistive element 10 and second conductive underlying layer 18. The first electrical resistivity of first conductive underlying layer 17 is higher than the second electrical resistivity of first electrode layer 21 and higher than the third electrical resistivity of resistive element 10. The fourth electrical resistivity of second conductive underlying layer 18 is higher than the fifth electrical resistivity of second electrode layer 26 and higher than the third electrical resistivity of resistive element 10.

Therefore, though the resistance value of chip resistor 1 is dependent on distance L (see FIG. 2), it is not dependent on the size of first electrode 20 (first electrode layer 21) and the size of second electrode 25 (second electrode layer 26). First electrode layer 21 is provided not only on first main surface 11 of resistive element 10 but also on first conductive underlying layer 17. Second electrode layer 26 is provided not only on first main surface 11 of resistive element 10 but also on second conductive underlying layer 18. When chip resistor 1 is bonded to circuit board 50 (see FIG. 3), chip resistor 1 can be bonded to circuit board 50 over a wider bonding area. Heat generated in chip resistor 1 can efficiently be radiated to circuit board 50. Chip resistor 1 in the present embodiment can achieve improved heat radiation performance independently of the resistance value thereof.

As set forth above, though the resistance value of chip resistor 1 is dependent on distance L (see FIG. 2), it is not dependent on the size of first electrode 20 (first electrode layer 21) and the size of second electrode 25 (second electrode layer 26). Therefore, the size of first electrode 20 (first electrode layer 21) and the size of second electrode layer 25 (second electrode layer 26) can be common among a plurality of chip resistors 1 various in distance L and resistance value. The size of conductive wire 52 and the size of conductive wire 53 of circuit board 50 (see FIG. 3) on which chip resistor 1 is mounted can be common. Design of circuit board 50 on which chip resistor 1 is mounted can be simplified.

In chip resistor 1 in the present embodiment, first conductive underlying layer 17 and second conductive underlying layer 18 are formed of a conductive resin containing a binder resin and conductive particles (for example, silver particles) dispersed in the binder resin. First electrode layer 21 and second electrode layer 26 are formed of a metal. Therefore, heat radiation performance of chip resistor 1 can be improved independently of the resistance value of chip resistor 1. Cost for manufacturing chip resistor 1 can be reduced.

Chip resistor 1 in the present embodiment further includes first insulating layer 15 provided on first main surface 11 of resistive element 10. First insulating layer 15 is arranged between first electrode 20 and second electrode 25 and arranged between first conductive underlying layer 17 and second conductive underlying layer 18.

First insulating layer 15 protects resistive element 10. Chip resistor 1 has a longer lifetime. First insulating layer 15 prevents first conductive underlying layer 17 and second conductive underlying layer 18 from coming in contact with each other and prevents first electrode layer 21 and second electrode layer 26 from coming in contact with each other.

In chip resistor 1 in the present embodiment, first end 15*a* of first insulating layer 15 proximate to first side surface 13*a* of resistive element 10 is covered with first conductive underlying layer 17. Second end 15*b* of first insulating layer 15 proximate to second side surface 13*b* of resistive element 10 is covered with second conductive underlying layer 18. Chip resistor 1 in the present embodiment can achieve improved heat radiation performance independently of the resistance value thereof.

In chip resistor 1 in the present embodiment, first electrode 20 further includes third electrode layer 22 and first thin metal layer 23. Third electrode layer 22 is provided on second main surface 12 of resistive element 10. First thin metal layer 23 electrically connects first electrode layer 21 and third electrode layer 22 to each other. Second electrode 25 further includes fourth electrode layer 27 and second thin metal layer 28. Fourth electrode layer 27 is provided on second main surface 12 of resistive element 10 and distant from third electrode layer 22. Second thin metal layer 28 electrically connects second electrode layer 26 and fourth electrode layer 27 to each other.

When chip resistor 1 is mounted on circuit board 50 (see FIG. 3), heat generated in chip resistor 1 can be radiated to circuit board 50 not only from first main surface 11 of resistive element 10 but also from second main surface 12 of resistive element 10 through third electrode layer 22, first thin metal layer 23, fourth electrode layer 27, and second thin metal layer 28. Heat radiation performance of chip resistor 1 can be improved.

In chip resistor 1 in the present embodiment, resistive element 10 includes central portion 10*m* exposed from first electrode 20 and second electrode 25 in the plan view of first main surface 11. First portion 21*m* of first electrode layer 21 that is in contact with resistive element 10 and most proximate to central portion 10*m* of resistive element 10 is more proximate to central portion 10*m* of resistive element 10 than third portion 22*m* of third electrode layer 22 that is in contact with resistive element 10 and most proximate to central portion 10*m* of resistive element 10 or flush with third portion 22*m* of third electrode layer 22. Second portion 26*m* of second electrode layer 26 that is in contact with resistive element 10 and most proximate to central portion 10*m* of resistive element 10 is more proximate to central portion 10*m* of resistive element 10 than fourth portion 27*m* of fourth electrode layer 27 that is in contact with resistive element 10 and most proximate to central portion 10*m* of resistive element 10 or flush with fourth portion 27*m* of fourth electrode layer 27.

Though the resistance value of chip resistor 1 is dependent on distance L between first portion 21*m* of first electrode layer 21 and second portion 26*m* of second electrode layer 26, it is not dependent on the size of first electrode 20 and the size of second electrode 25. Chip resistor 1 in the present embodiment can achieve improved heat radiation performance independently of the resistance value thereof.

In chip resistor 1 in the present embodiment, first thin metal layer 23 and second thin metal layer 28 are each formed of a conductive material containing tin. Therefore, chip resistor 1 can readily be mounted on circuit board 50 (see FIG. 3) with the use of solder.

Chip resistor 1 in the present embodiment further includes second insulating layer 16 provided on second main surface 12 of resistive element 10. Second insulating layer 16 is arranged between third electrode layer 22 and fourth electrode layer 27.

Second insulating layer 16 protects resistive element 10. Chip resistor 1 has a longer lifetime. Second insulating layer 16 prevents third electrode layer 22 and fourth electrode layer 27 from coming in contact with each other.

In chip resistor 1 in the present embodiment, chip resistor 1 is a shunt resistor. Therefore, heat radiation performance of chip resistor 1 can be improved independently of the resistance value thereof. Chip resistor 1 suitable for detection of a current can be provided.

The method of manufacturing chip resistor 1 in the present embodiment includes forming on first main surface 11 of band-shaped resistive element 10*a*, first conductive underlying layer 17 and second conductive underlying layer 18 distant from first conductive underlying layer 17 and forming first conductive film 40 on first conductive underlying layer 17, second conductive underlying layer 18, and the portion of first main surface 11 of band-shaped resistive element 10*a* exposed from first conductive underlying layer 17 and second conductive underlying layer 18. The method of manufacturing chip resistor 1 in the present embodiment further includes dividing band-shaped resistive element 10*a* to form resistive element 10 including first side surface 13*a* and second side surface 13*b*. As a result of division of band-shaped resistive element 10*a*, first conductive film 40 is divided into first electrode layer 21 proximate to first side surface 13*a* and second electrode layer 26 proximate to second side surface 13*b* and distant from first electrode layer 21. The first electrical resistivity of first conductive underlying layer 17 is higher than the second electrical resistivity of first electrode layer 21 and higher than the third electrical resistivity of resistive element 10. The fourth electrical resistivity of second conductive underlying layer 18 is higher than the fifth electrical resistivity of second electrode layer 26 and higher than the third electrical resistivity of resistive element 10.

Therefore, though the resistance value of chip resistor 1 is dependent on distance L (see FIG. 2), it is not dependent on the size of first electrode layer 21 and the size of second electrode layer 26. First electrode layer 21 is provided not only on first main surface 11 of resistive element 10 but also on first conductive underlying layer 17. Second electrode layer 26 is provided not only on first main surface 11 of resistive element 10 but also on second conductive underlying layer 18. When chip resistor 1 is bonded to circuit board 50 (see FIG. 3), chip resistor 1 can be bonded to circuit board 50 over a wider bonding area. Heat generated in chip resistor 1 can efficiently be radiated to circuit board 50.

According to the method of manufacturing chip resistor 1 in the present embodiment, chip resistor 1 that achieves improved heat radiation performance independently of the resistance value thereof can be obtained.

As set forth above, though the resistance value of chip resistor 1 is dependent on distance L (see FIG. 2), it is not dependent on the size of first electrode layer 21 and the size of second electrode layer 26. Therefore, the size of first electrode layer 21 and the size of second electrode layer 26 can be common among a plurality of chip resistors 1 various in distance L and resistance value. The size of conductive wire 52 and the size of conductive wire 53 of circuit board 50 (see FIG. 3) on which chip resistor 1 is mounted can be common. Design of circuit board 50 (see FIG. 3) on which chip resistor 1 is mounted can be simplified.

In the method of manufacturing chip resistor 1 in the present embodiment, first conductive underlying layer 17 and second conductive underlying layer 18 are provided by printing. First conductive film 40 is provided by plating. Therefore, productivity of chip resistor 1 can be improved and cost for manufacturing chip resistor 1 can be reduced.

Second Embodiment

Figure 14:
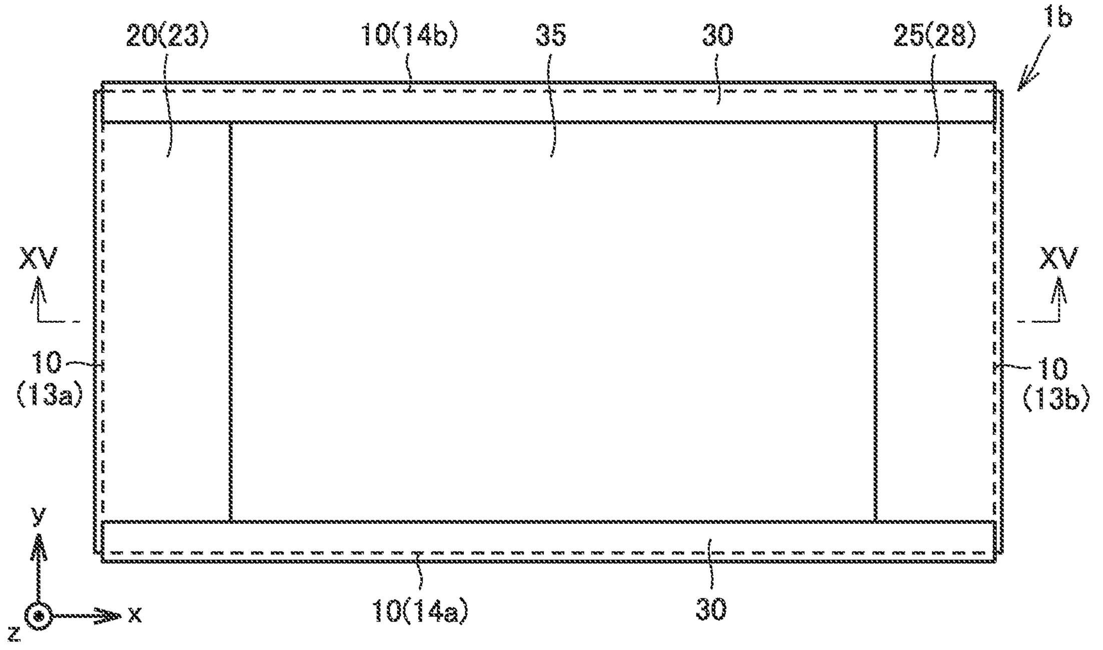
FIG. 14 is a schematic plan view of a chip resistor in the second embodiment.
Figure 15:
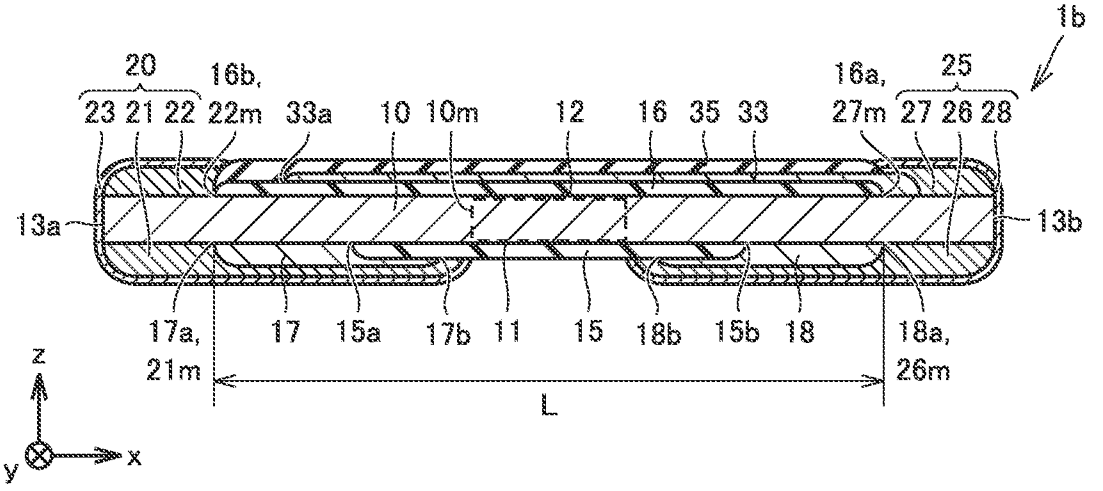
FIG. 15 is a schematic cross-sectional view along a section line XV-XV shown in FIG. 14, of the chip resistor in the second embodiment.

A chip resistor 1*b* in a second embodiment will be described with reference to FIGS. 14 and 15. Though chip resistor 1*b* in the present embodiment is similar in configuration to chip resistor 1 in the first embodiment, it is different in aspects below.

Chip resistor 1*b* further includes a third conductive underlying layer 33. Chip resistor 1*b* may further include a third insulating layer 35.

Third conductive underlying layer 33 is provided on second main surface 12 of resistive element 10 and second insulating layer 16. Third conductive underlying layer 33 is in contact with fourth electrode layer 27 and distant from third electrode layer 22 in the first direction (the x direction). A part of third conductive underlying layer 33 is exposed from third insulating layer 35. Third conductive underlying layer 33 includes an end 33*a* proximate to first side surface 13*a*. End 33*a* of third conductive underlying layer 33 is covered with third insulating layer 35. End 33*a* of third conductive underlying layer 33 is distant from third electrode layer 22 in the first direction (the x direction).

Third end 16*a* of second insulating layer 16 proximate to second side surface 13*b* of resistive element 10 is covered with third conductive underlying layer 33. In the plan view of second main surface 12 of resistive element 10, third conductive underlying layer 33 overlaps with second conductive underlying layer 18. In the plan view of second main surface 12 of resistive element 10, third conductive underlying layer 33 overlaps with central portion 10*m* of resistive element 10 in the first direction (the x direction) in which first electrode 20 and second electrode 25 are distant from each other. In the plan view of second main surface 12 of resistive element 10, third conductive underlying layer 33 may overlap with first conductive underlying layer 17. Fourth end 16*b* of second insulating layer 16 proximate to first side surface 13*a* of resistive element 10 is exposed from third conductive underlying layer 33.

A sixth electrical resistivity of third conductive underlying layer 33 is higher than the seventh electrical resistivity of fourth electrode layer 27 and higher than the third electrical resistivity of resistive element 10. Therefore, when a current flows through chip resistor 1, substantially no current flows through third conductive underlying layer 33. Third conductive underlying layer 33 does not substantially vary the resistance value of chip resistor 1.

The sixth electrical resistivity of third conductive underlying layer 33 is, for example, at least ten times as high as the seventh electrical resistivity of fourth electrode layer 27. The sixth electrical resistivity of third conductive underlying layer 33 may be at least twenty times, at least fifty times, or at least one hundred times as high as the seventh electrical resistivity of fourth electrode layer 27. The sixth electrical resistivity of third conductive underlying layer 33 is, for example, at least five times as high as the third electrical resistivity of resistive element 10. The sixth electrical resistivity of third conductive underlying layer 33 may be at least ten times, at least twenty-five times, or at least fifty times as high as the third electrical resistivity of resistive element 10. Third conductive underlying layer 33 is formed of a conductive resin containing a binder resin (for example, an epoxy resin, a phenol resin, or a polyimide resin) and conductive particles (for example, silver particles) dispersed in the binder resin.

Fourth electrode layer 27 is further provided on third conductive underlying layer 33. A thickness of fourth electrode layer 27 on third conductive underlying layer 33 is much smaller than the thickness of fourth electrode layer 27 on first main surface 11 of resistive element 10. The thickness of fourth electrode layer 27 on third conductive underlying layer 33 is, for example, at most 0.1 time as large as the thickness of fourth electrode layer 27 on first main surface 11 of resistive element 10.

Third insulating layer 35 is provided on third conductive underlying layer 33 and second insulating layer 16. Third insulating layer 35 protects third conductive underlying layer 33. Third insulating layer 35 is formed of an insulating resin such as an epoxy resin.

A method of manufacturing chip resistor 1*b* in the present embodiment will be described with reference to FIGS. 4 to 7 and 14 to 20. Though the method of manufacturing chip resistor 1*b* in the present embodiment includes steps similar to those in the method of manufacturing chip resistor 1 in the first embodiment, it is different mainly in aspects below.

Figure 16:
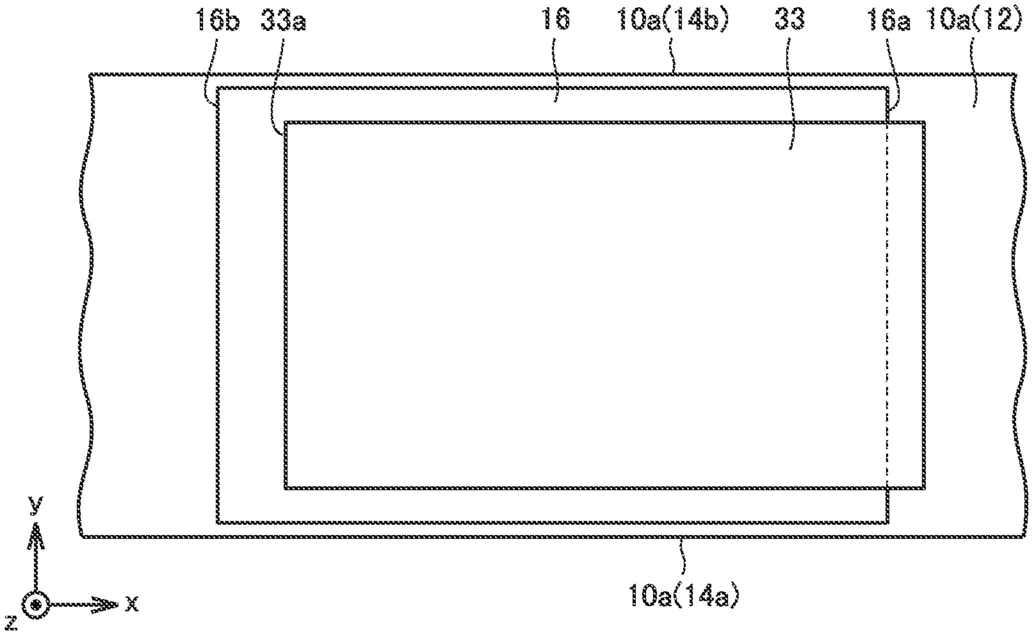
FIG. 16 is a schematic plan view showing a step following the steps shown in FIGS. 5 and 6 in a method of manufacturing a chip resistor in the second embodiment.

The method of manufacturing chip resistor 1*b* in the present embodiment includes the steps shown in FIGS. 4 to 6. Referring to FIGS. 7 and 16, the method of manufacturing chip resistor 1*b* in the present embodiment includes forming first conductive underlying layer 17 and second conductive underlying layer 18 on first main surface 11 of band-shaped resistive element 10*a* and forming third conductive underlying layer 33 on second main surface 12 of band-shaped resistive element 10*a* and second insulating layer 16.

Third end 16*a* of second insulating layer 16 is covered with third conductive underlying layer 33. In the plan view of second main surface 12 of band-shaped resistive element 10*a*, third conductive underlying layer 33 overlaps with second conductive underlying layer 18. In the plan view of second main surface 12 of band-shaped resistive element 10*a*, third conductive underlying layer 33 may overlap with first conductive underlying layer 17. Fourth end 16*b* of second insulating layer 16 is exposed from third conductive underlying layer 33.

Third conductive underlying layer 33 is formed, for example, of a conductive resin containing a binder resin (for example, an epoxy resin, a phenol resin, or a polyimide resin) and conductive particles (for example, silver particles) dispersed in the binder resin. Third conductive underlying layer 33 is provided, for example, by printing such as screen printing.

Figure 17:
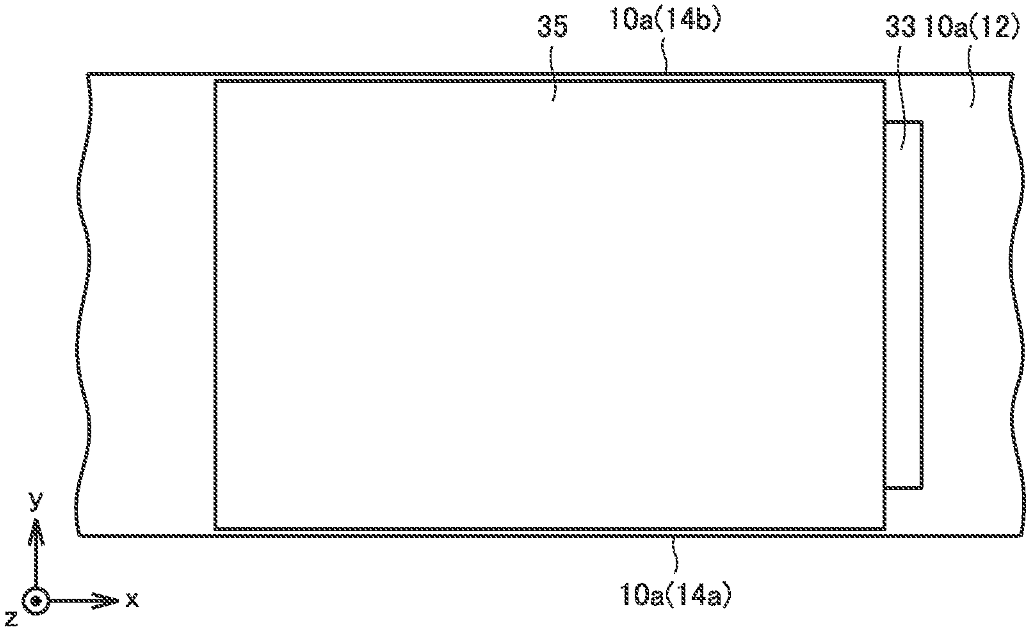
FIG. 17 is a schematic plan view showing a step following the steps shown in FIGS. 7 and 16 in the method of manufacturing a chip resistor in the second embodiment.

Referring to FIG. 17, the method of manufacturing chip resistor 1*b* in the present embodiment includes forming third insulating layer 35 on third conductive underlying layer 33 and second insulating layer 16. A part of third conductive underlying layer 33 is exposed from third insulating layer 35. Third insulating layer 35 is formed, for example, of an insulating resin such as an epoxy resin. Third insulating layer 35 is provided, for example, by printing such as screen printing.

Figure 18:
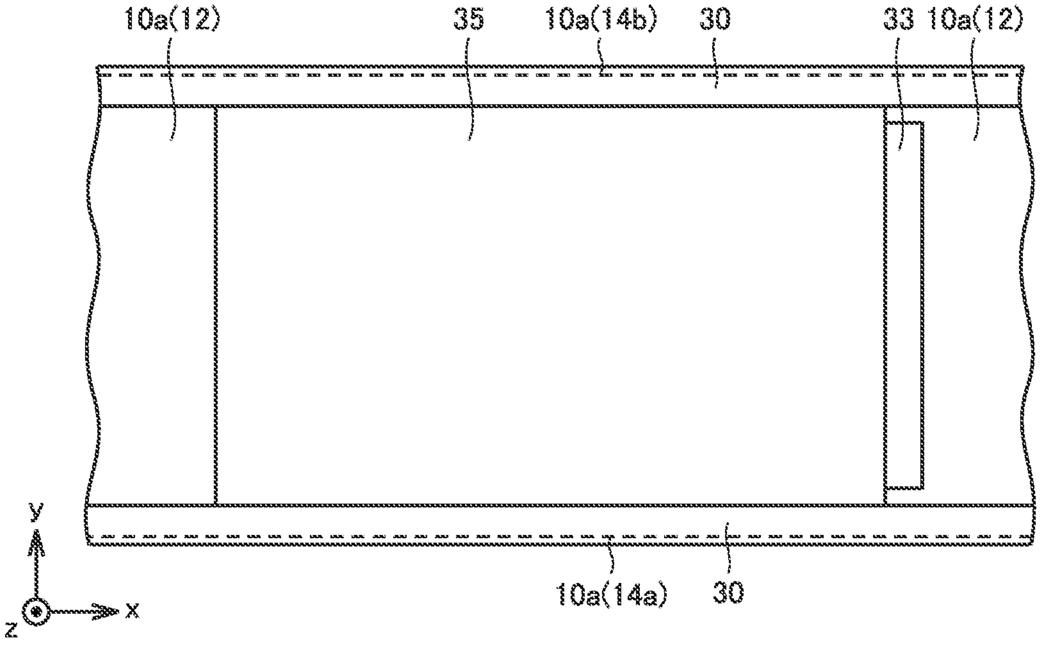
FIG. 18 is a schematic plan view showing a step following the step shown in FIG. 17 in the method of manufacturing a chip resistor in the second embodiment.

Referring to FIGS. 8 and 18, the method of manufacturing chip resistor 1*b* in the present embodiment includes forming insulating coating film 30. The step of forming insulating coating film 30 in the present embodiment is similar to the step of forming insulating coating film 30 in the first embodiment. Insulating coating film 30 further covers a fifth band-shaped region of third insulating layer 35 that is proximate to third side surface 14*a* and a sixth band-shaped region of third insulating layer 35 that is proximate to fourth side surface 14*b*.

Figure 19:
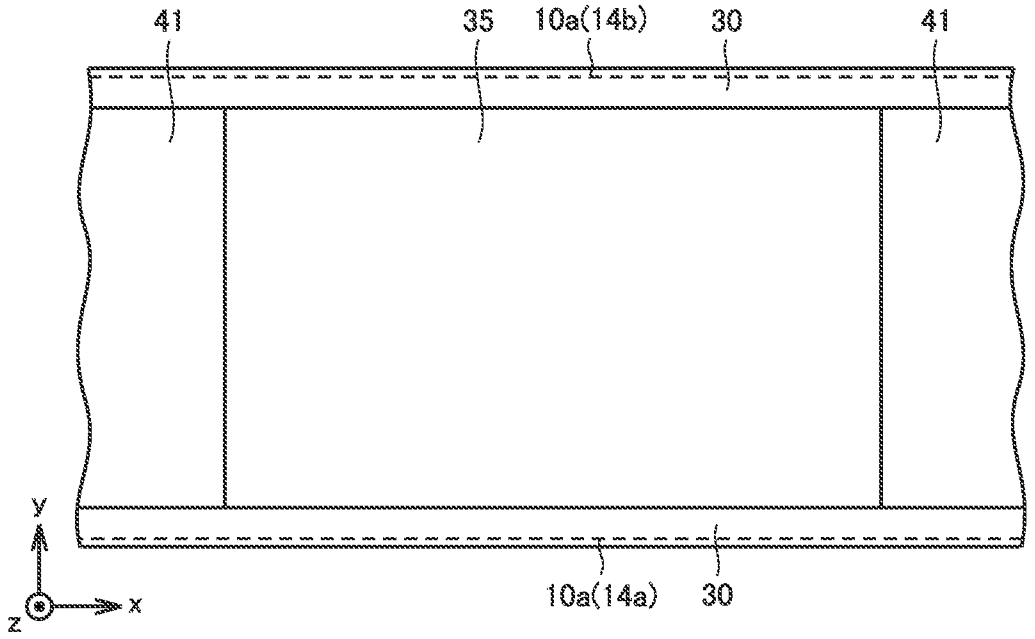
FIG. 19 is a schematic plan view showing a step following the steps shown in FIGS. 8 and 18 in the method of manufacturing a chip resistor in the second embodiment and a schematic plan view showing a step following the steps shown in FIGS. 8 and 25 in the method of manufacturing a chip resistor in the third embodiment.

Referring to FIGS. 10 and 19, the method of manufacturing chip resistor 1*b* in the present embodiment includes forming first conductive film 40 and second conductive film 41 similarly to the method of manufacturing chip resistor 1 in the first embodiment. Second conductive film 41 is formed on third conductive underlying layer 33 and a portion of second main surface 12 of resistive element 10 exposed from insulating coating film 30, third insulating layer 35, and third conductive underlying layer 33.

When second conductive film 41 is formed, for example, by plating, the thickness of second conductive film 41 on third electrode layer 33 becomes much smaller than the thickness of second electrode layer 41 on first main surface 11 of resistive element 10.

Figure 20:
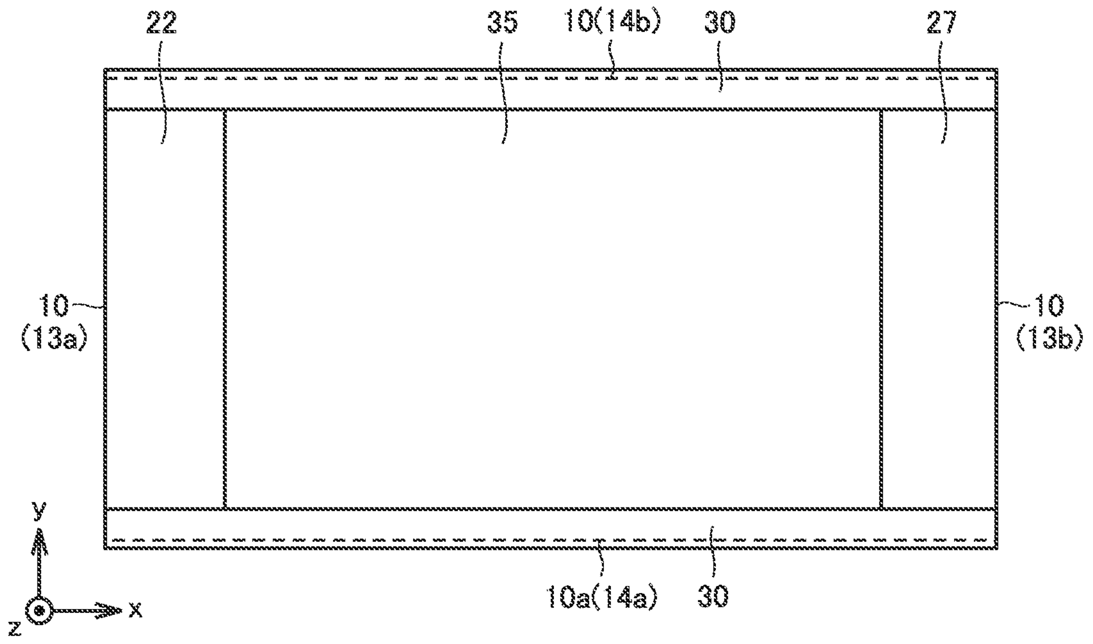
FIG. 20 is a schematic plan view showing a step following the steps shown in FIGS. 10 and 19 in the method of manufacturing a chip resistor in the second and third embodiments.

Referring to FIGS. 12 and 20, the method of manufacturing chip resistor 1*b* in the present embodiment includes dividing band-shaped resistive element 10*a* to form resistive element 10 including first side surface 13*a* and second side surface 13*b* similarly to the method of manufacturing chip resistor 1 in the first embodiment. As a result of division of band-shaped resistive element 10*a*, first conductive film 40 is divided into first electrode layer 21 and second electrode layer 26. Second conductive film 41 is divided into third electrode layer 22 and fourth electrode layer 27. Third conductive underlying layer 33 is in contact with fourth electrode layer 27 and distant from third electrode layer 22. Fourth electrode layer 27 is provided not only on second main surface 12 of resistive element 10 but also on third conductive underlying layer 33.

The method of manufacturing chip resistor 1*b* in the present embodiment includes forming first thin metal layer 23 and second thin metal layer 28 similarly to the method of manufacturing chip resistor 1 in the first embodiment. Chip resistor 1*b* shown in FIGS. 14 and 15 is thus obtained.

Chip resistor 1*b* and the method of manufacturing the same in the present embodiment achieve effects below in addition to the effects of chip resistor 1 and the method of manufacturing the same in the first embodiment.

Chip resistor 1*b* in the present embodiment further includes third conductive underlying layer 33 provided on second main surface 12 of resistive element 10 and second insulating layer 16. Third conductive underlying layer 33 is in contact with fourth electrode layer 27 and distant from third electrode layer 22. Third end 16*a* of second insulating layer 16 proximate to second side surface 13*b* of resistive element 10 is covered with third conductive underlying layer 33. The sixth electrical resistivity of third conductive underlying layer 33 is higher than the seventh electrical resistivity of fourth electrode layer 27 and higher than the third electrical resistivity of resistive element 10.

When chip resistor 1*b* is mounted on circuit board 50 (see FIG. 3), heat generated in chip resistor 1*b* can be radiated to circuit board 50 not only from first main surface 11 of resistive element 10 but also from second main surface 12 of resistive element 10 through third conductive underlying layer 33, fourth electrode layer 27, and second thin metal layer 28. Third conductive underlying layer 33 does not substantially vary the resistance value of chip resistor 1*b*. Heat radiation performance of chip resistor 1*b* can be improved independently of the resistance value of chip resistor 1*b*.

In chip resistor 1*b* in the present embodiment, in the plan view of second main surface 12 of resistive element 10, third conductive underlying layer 33 overlaps with central portion 10*m* of resistive element 10 in the direction (the first direction (the x direction)) in which first electrode 20 and second electrode 25 are distant from each other.

When chip resistor 1*b* is mounted on circuit board 50 (see FIG. 3), heat generated in chip resistor 1*b* can be radiated to circuit board 50 from central portion 10*m* of resistive element 10 where a temperature is highest in chip resistor 1*b* through third conductive underlying layer 33, fourth electrode layer 27, and second thin metal layer 28. Heat radiation performance of chip resistor 1*b* can be improved.

In chip resistor 1*b* in the present embodiment, third conductive underlying layer 33 is formed of a conductive resin containing a binder resin and conductive particles dispersed in the binder resin. Fourth electrode layer 27 is formed of a metal. Therefore, heat radiation performance of chip resistor 1*b* can be improved independently of the resistance value thereof. Cost for manufacturing chip resistor 1*b* can be reduced.

The method of manufacturing chip resistor 1*b* in the present embodiment further includes forming second insulating layer 16 on second main surface 12 of band-shaped resistive element 10*a* opposite to first main surface 11 of band-shaped resistive element 10*a*, forming third conductive underlying layer 33 on second main surface 12 of band-shaped resistive element 10*a* and second insulating layer 16, forming second conductive film 41 on third conductive underlying layer 33 and the portion of second main surface 12 of band-shaped resistive element 10*a* that is exposed from third conductive underlying layer 33, and forming first thin metal layer 23 and second thin metal layer 28. As a result of division of band-shaped resistive element 10*a*, second conductive film 41 is divided into third electrode layer 22 proximate to first side surface 13*a* and fourth electrode layer 27 proximate to second side surface 13*b* and distant from third electrode layer 22. Third conductive underlying layer 33 is in contact with fourth electrode layer 27 and distant from third electrode layer 22. First thin metal layer 23 electrically connects first electrode layer 21 and third electrode layer 22 to each other. Second thin metal layer 28 electrically connects second electrode layer 26 and fourth electrode layer 27 to each other. The sixth electrical resistivity of third conductive underlying layer 33 is higher than the seventh electrical resistivity of fourth electrode layer 27 and higher than the third electrical resistivity of resistive element 10.

When chip resistor 1*b* is mounted on circuit board 50 (see FIG. 3), heat generated in chip resistor 1*b* can be radiated not only from first main surface 11 of resistive element 10 but also from second main surface 12 of resistive element 10 through third conductive underlying layer 33, fourth electrode layer 27, and second thin metal layer 28. Third conductive underlying layer 33 does not substantially vary the resistance value of chip resistor 1*b*. Chip resistor 1*b* that achieves improved heat radiation performance independently of the resistance value thereof can be obtained.

In the method of manufacturing chip resistor 1*b* in the present embodiment, third conductive underlying layer 33 is provided by printing. Second conductive film 41 is provided by plating. Therefore, productivity of chip resistor 1*b* can be improved and cost for manufacturing chip resistor 1*b* can be reduced.

Third Embodiment

Figure 21:
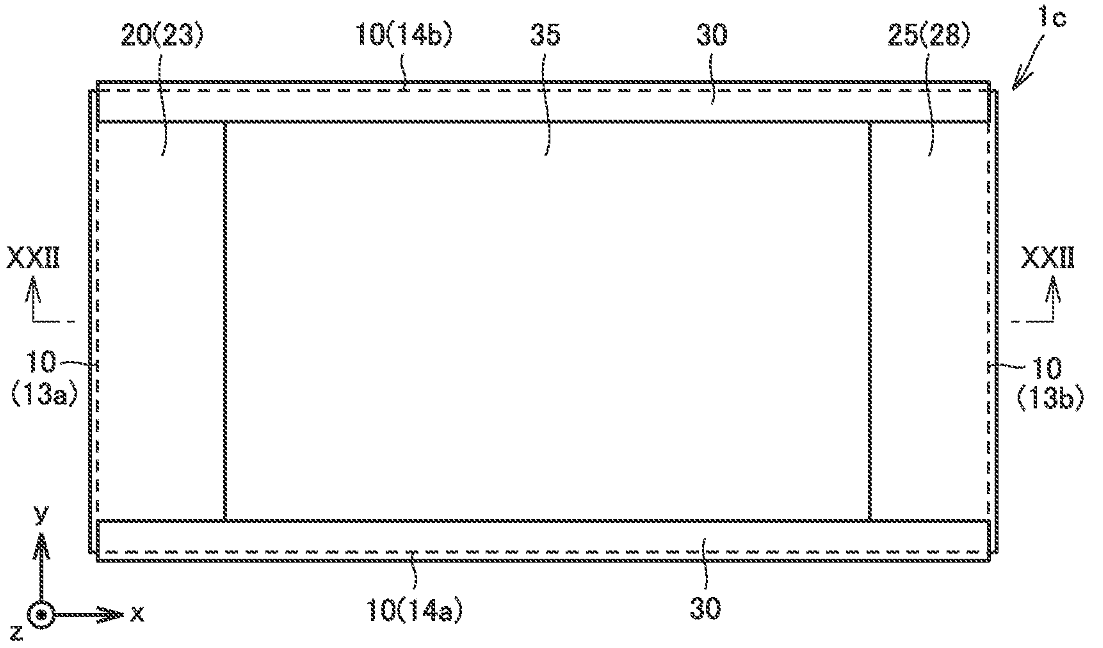
FIG. 21 is a schematic plan view of a chip resistor in the third embodiment.
Figure 22:
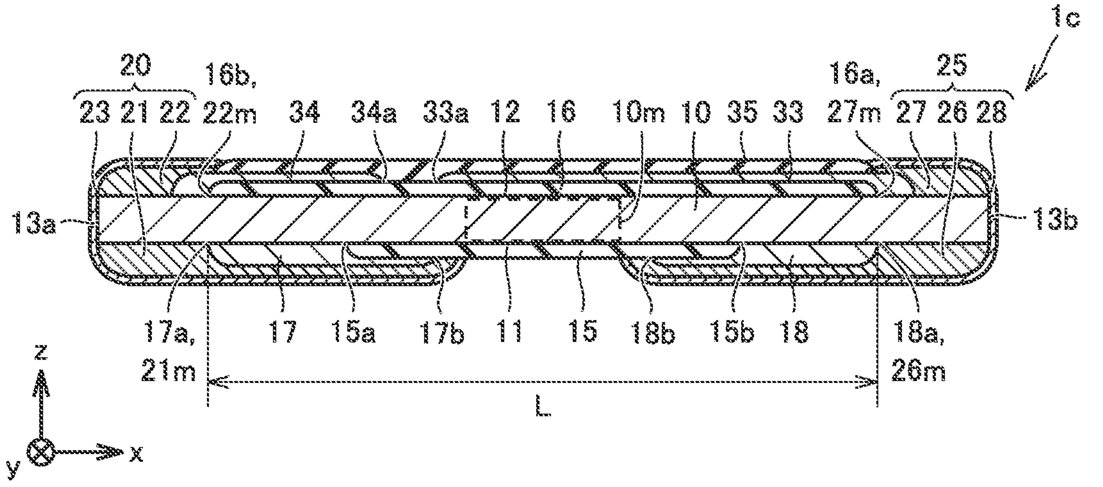
FIG. 22 is a schematic cross-sectional view along a section line XXII-XXII shown in FIG. 21, of the chip resistor in the third embodiment.

A chip resistor 1*c* in a third embodiment will be described with reference to FIGS. 21 and 22. Though chip resistor 1*c* in the present embodiment is similar in configuration to chip resistor 1*b* in the second embodiment, it is different in aspects below.

Chip resistor 1*c* further includes a fourth conductive underlying layer 34. Fourth conductive underlying layer 34 is provided on second main surface 12 of resistive element 10 and second insulating layer 16. Fourth conductive underlying layer 34 is in contact with third electrode layer 22 and distant from third conductive underlying layer 33 and fourth electrode layer 27 in the first direction (the x direction). A part of fourth conductive underlying layer 34 is exposed from third insulating layer 35. Fourth conductive underlying layer 34 includes an end 34*a* proximate to second side surface 13*b*. End 34*a* of fourth conductive underlying layer 34 is covered with third insulating layer 35. End 34*a* of fourth conductive underlying layer 34 is distant from end 33*a* of third conductive underlying layer 33 and fourth electrode layer 27 in the first direction (the x direction).

Fourth end 16*b* of second insulating layer 16 proximate to first side surface 13*a* of resistive element 10 is covered with fourth conductive underlying layer 34. In the plan view of second main surface 12 of resistive element 10, fourth conductive underlying layer 34 overlaps with first conductive underlying layer 17. In the plan view of second main surface 12 of resistive element 10, fourth conductive underlying layer 34 is distant from central portion 10*m* of resistive element 10 in the first direction (the x direction) in which first electrode 20 and second electrode 25 are distant from each other.

An eighth electrical resistivity of fourth conductive underlying layer 34 is higher than the ninth electrical resistivity of third electrode layer 22 and higher than the third electrical resistivity of resistive element 10. Therefore, when a current flows through chip resistor 1*c*, substantially no current flows through fourth conductive underlying layer 34. Fourth conductive underlying layer 34 does not substantially vary the resistance value of chip resistor 1*c*.

The eighth electrical resistivity of fourth conductive underlying layer 34 is, for example, at least ten times as high as the ninth electrical resistivity of third electrode layer 22. The eighth electrical resistivity of fourth conductive underlying layer 34 may be at least twenty times, at least fifty times, or at least one hundred times as high as the ninth electrical resistivity of third electrode layer 22. The eighth electrical resistivity of fourth conductive underlying layer 34 is, for example, at least five times as high as the third electrical resistivity of resistive element 10. The eighth electrical resistivity of fourth conductive underlying layer 34 may be at least ten times, at least twenty-five times, or at least fifty times as high as the third electrical resistivity of resistive element 10. Fourth conductive underlying layer 34 is formed of a conductive resin containing a binder resin (for example, an epoxy resin, a phenol resin, or a polyimide resin) and conductive particles (for example, silver particles) dispersed in the binder resin.

Third electrode layer 22 is further provided on fourth conductive underlying layer 34. A thickness of third electrode layer 22 on fourth conductive underlying layer 34 is much smaller than the thickness of third electrode layer 22 on second main surface 12 of resistive element 10. The thickness of third electrode layer 22 on fourth conductive underlying layer 34 is, for example, at most 0.1 time as large as the thickness of third electrode layer 22 on second main surface 12 of resistive element 10.

Third insulating layer 35 is provided on third conductive underlying layer 33, fourth conductive underlying layer 34, and second insulating layer 16. Third insulating layer 35 protects third conductive underlying layer 33 and fourth conductive underlying layer 34.

A method of manufacturing chip resistor 1*c* in the present embodiment will be described with reference to FIGS. 4 to 7, 10, 12, and 21 to 25. Though the method of manufacturing chip resistor 1*c* in the present embodiment includes steps similar to those in the method of manufacturing chip resistor 1*b* in the second embodiment, it is different mainly in aspects below.

Figure 23:
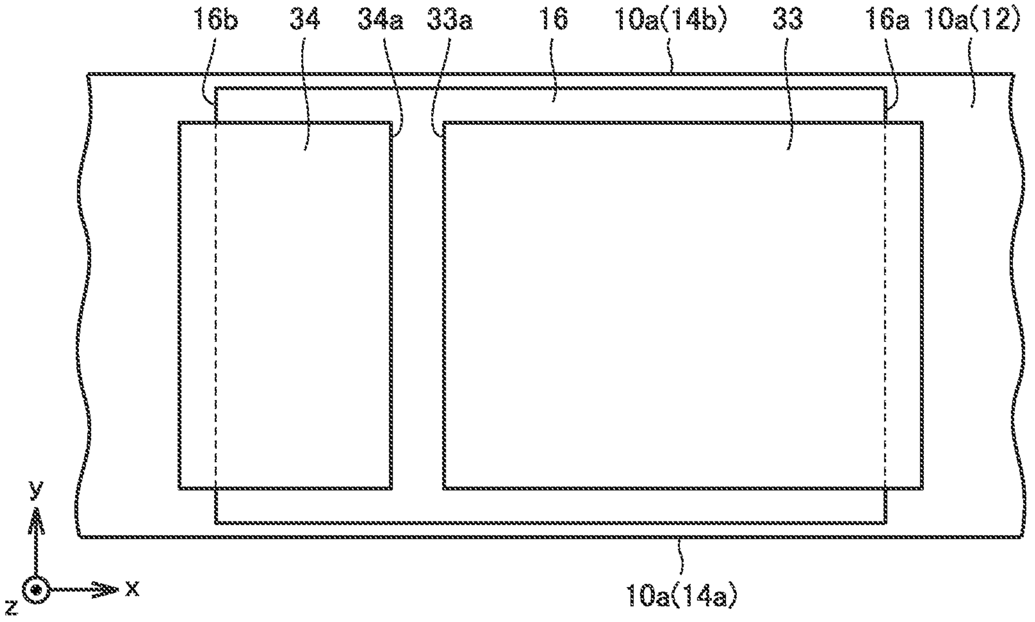
FIG. 23 is a schematic plan view showing a step following the steps shown in FIGS. 5 and 6 in a method of manufacturing a chip resistor in the third embodiment.

The method of manufacturing chip resistor 1*c* in the present embodiment includes the steps shown in FIGS. 4 to 6. Referring to FIGS. 7 and 23, the method of manufacturing chip resistor 1*c* in the present embodiment includes forming first conductive underlying layer 17 and second conductive underlying layer 18 on first main surface 11 of band-shaped resistive element 10*a* and forming third conductive underlying layer 33 and fourth conductive underlying layer 34 on second main surface 12 of band-shaped resistive element 10*a* and second insulating layer 16.

Fourth end 16*b* of second insulating layer 16 is covered with fourth conductive underlying layer 34. In the plan view of second main surface 12 of band-shaped resistive element 10*a*, fourth conductive underlying layer 34 overlaps with first conductive underlying layer 17. Fourth conductive underlying layer 34 is distant from third conductive underlying layer 33 in the first direction (the x direction).

Fourth conductive underlying layer 34 is formed, for example, of a conductive resin containing a binder resin (for example, an epoxy resin, a phenol resin, or a polyimide resin) and conductive particles (for example, silver particles) dispersed in the binder resin. Fourth conductive underlying layer 34 is provided, for example, by printing such as screen printing.

Figure 24:
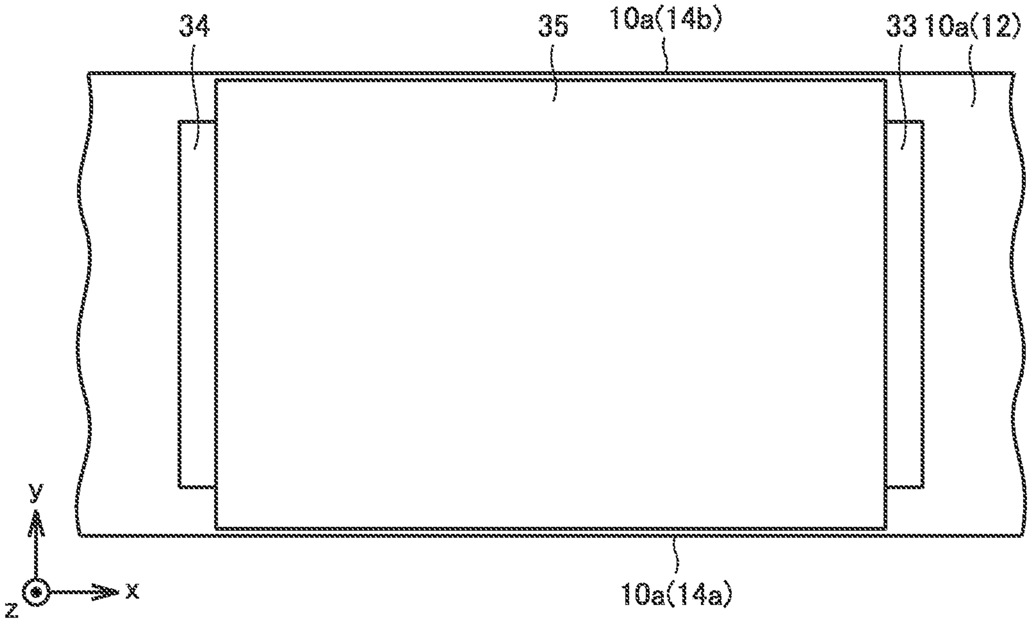
FIG. 24 is a schematic plan view showing a step following the steps shown in FIGS. 7 and 23 in the method of manufacturing a chip resistor in the third embodiment.

Referring to FIG. 24, the method of manufacturing chip resistor 1*c* in the present embodiment includes forming third insulating layer 35 on third conductive underlying layer 33, fourth conductive underlying layer 34, and second insulating layer 16. A part of third conductive underlying layer 33 and a part of fourth conductive underlying layer 34 are exposed from third insulating layer 35.

Figure 25:
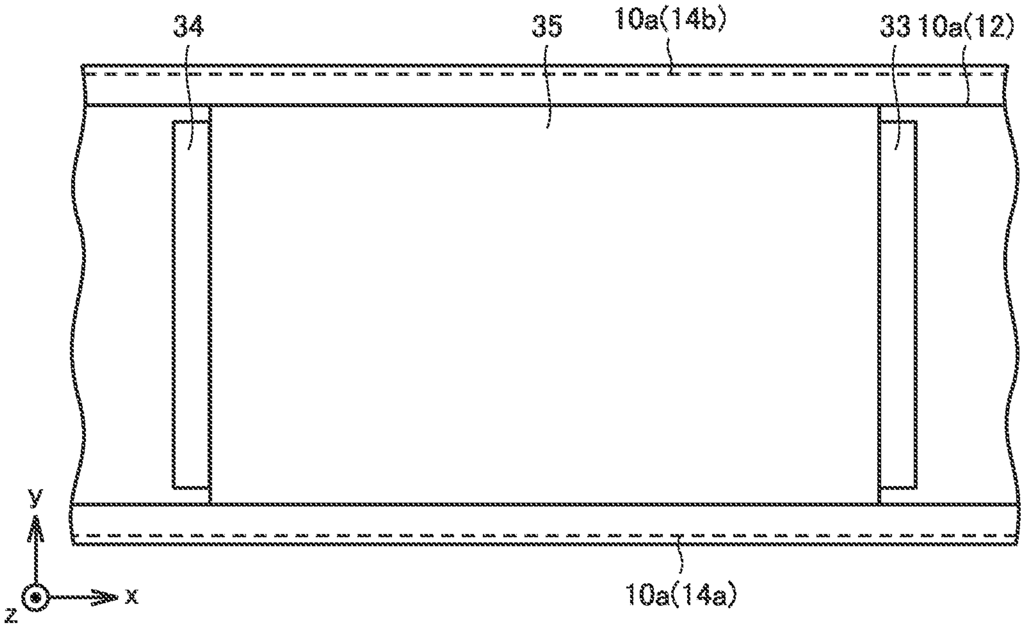
FIG. 25 is a schematic plan view showing a step following the step shown in FIG. 24 in the method of manufacturing a chip resistor in the third embodiment.

Referring to FIGS. 8 and 25, the method of manufacturing chip resistor 1*c* in the present embodiment includes forming insulating coating film 30. The step of forming insulating coating film 30 in the present embodiment is similar to the step of forming insulating coating film 30 in the second embodiment.

Referring to FIGS. 10 and 19, the method of manufacturing chip resistor 1*c* in the present embodiment includes forming first conductive film 40 and second conductive film 41 similarly to the method of manufacturing chip resistor 1*b* in the second embodiment. Second conductive film 41 is formed on third conductive underlying layer 33, fourth conductive underlying layer 34, and a portion of second main surface 12 of resistive element 10 exposed from insulating coating film 30, third insulating layer 35, third conductive underlying layer 33, and fourth conductive underlying layer 34.

When second conductive film 41 is formed, for example, by plating, the thickness of second conductive film 41 on fourth conductive underlying layer 34 becomes much smaller than the thickness of second conductive film 41 on second main surface 12 of resistive element 10.

Referring to FIGS. 12 and 20, the method of manufacturing chip resistor 1*c* in the present embodiment includes dividing band-shaped resistive element 10*a* to form resistive element 10 including first side surface 13*a* and second side surface 13*b* similarly to the method of manufacturing chip resistor 1*b* in the second embodiment. As a result of division of band-shaped resistive element 10*a*, first conductive film 40 is divided into first electrode layer 21 and second electrode layer 26. Second conductive film 41 is divided into third electrode layer 22 and fourth electrode layer 27. Fourth conductive underlying layer 34 is in contact with third electrode layer 22 and distant from fourth electrode layer 27. Third electrode layer 22 is formed not only on second main surface 12 of resistive element 10 but also on fourth conductive underlying layer 34.

The method of manufacturing chip resistor 1*c* in the present embodiment includes forming first thin metal layer 23 and second thin metal layer 28 similarly to the method of manufacturing chip resistor 1*b* in the second embodiment. Chip resistor 1*c* shown in FIGS. 21 and 22 is thus obtained.

Chip resistor 1*c* and the method of manufacturing the same in the present embodiment achieve effects below in addition to the effects of chip resistor 1*b* and the method of manufacturing the same in the second embodiment.

Chip resistor 1*c* in the present embodiment further includes fourth conductive underlying layer 34 provided on second main surface 12 of resistive element 10 and second insulating layer 16. Fourth conductive underlying layer 34 is in contact with third electrode layer 22 and distant from third conductive underlying layer 33 and fourth electrode layer 27. Fourth end 16*b* of second insulating layer 16 proximate to first side surface 13*a* of resistive element 10 is covered with fourth conductive underlying layer 34. The eighth electrical resistivity of fourth conductive underlying layer 34 is higher than the ninth electrical resistivity of third electrode layer 22 and higher than the third electrical resistivity of resistive element 10.

When chip resistor 1*c* is mounted on circuit board 50 (see FIG. 3), heat generated in chip resistor 1*c* can be radiated to circuit board 50 not only from first main surface 11 of resistive element 10 but also from second main surface 12 of resistive element 10 through third conductive underlying layer 33, fourth conductive underlying layer 34, third electrode layer 22, and fourth electrode layer 27. Fourth conductive underlying layer 34 does not substantially vary the resistance value of chip resistor 1*c*. Heat radiation performance of chip resistor 1*c* can be improved independently of the resistance value thereof.

In chip resistor 1*c* in the present embodiment, fourth conductive underlying layer 34 is formed of a conductive resin containing a binder resin and conductive particles dispersed in the binder resin. Third electrode layer 22 is formed of a metal. Therefore, heat radiation performance of chip resistor 1*c* can be improved independently of the resistance value thereof. Cost for manufacturing chip resistor 1*c* can be reduced.

The method of manufacturing chip resistor 1*c* in the present embodiment further includes forming fourth conductive underlying layer 34 distant from third conductive underlying layer 33, on second main surface 12 of band-shaped resistive element 10*a* and second insulating layer 16. Second conductive film 41 is formed also on fourth conductive underlying layer 34. Fourth conductive underlying layer 34 is in contact with third electrode layer 22 and distant from fourth electrode layer 27. The eighth electrical resistivity of fourth conductive underlying layer 34 is higher than the ninth electrical resistivity of third electrode layer 22 and higher than the third electrical resistivity of resistive element 10.

When chip resistor 1*c* is mounted on circuit board 50 (see FIG. 3), heat generated in chip resistor 1*c* can be radiated to circuit board 50 not only from first main surface 11 of resistive element 10 but also from second main surface 12 of resistive element 10 through third conductive underlying layer 33, fourth electrode layer 27, third electrode layer 22, and fourth conductive underlying layer 34. Fourth conductive underlying layer 34 does not substantially vary the resistance value of chip resistor 1*c*. Chip resistor 1*c* that achieves improved heat radiation performance independently of the resistance value thereof can be obtained.

In the method of manufacturing chip resistor 1*c* in the present embodiment, fourth conductive underlying layer 34 is provided by printing. Therefore, productivity of chip resistor 1*c* can be improved and cost for manufacturing chip resistor 1*c* can be reduced.

Fourth Embodiment

Figure 26:
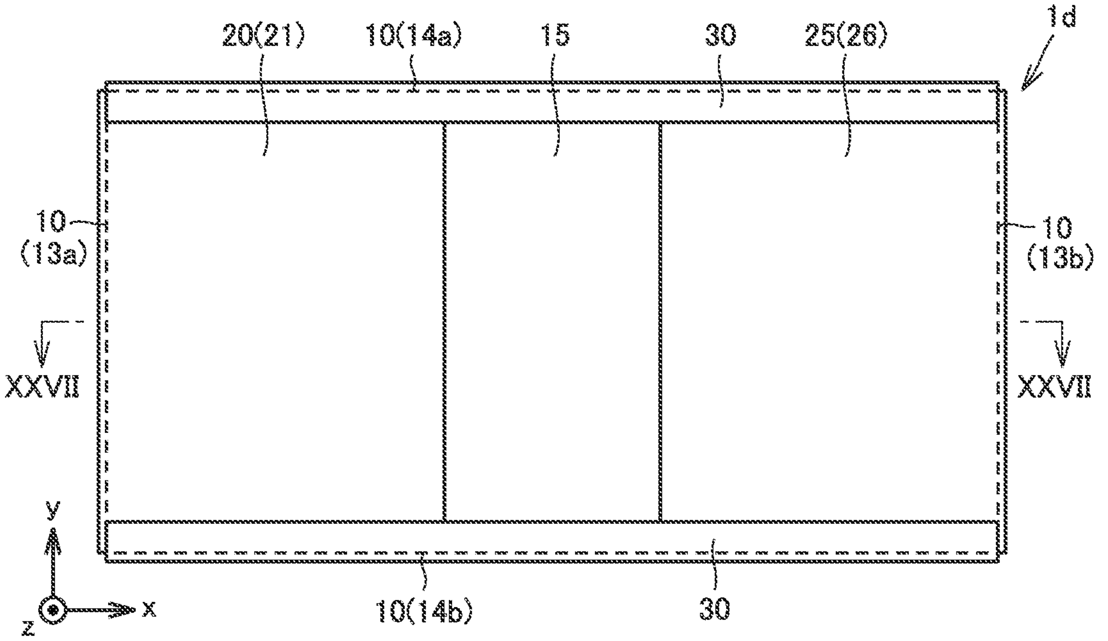
FIG. 26 is a schematic plan view of a chip resistor in the fourth embodiment.
Figure 27:
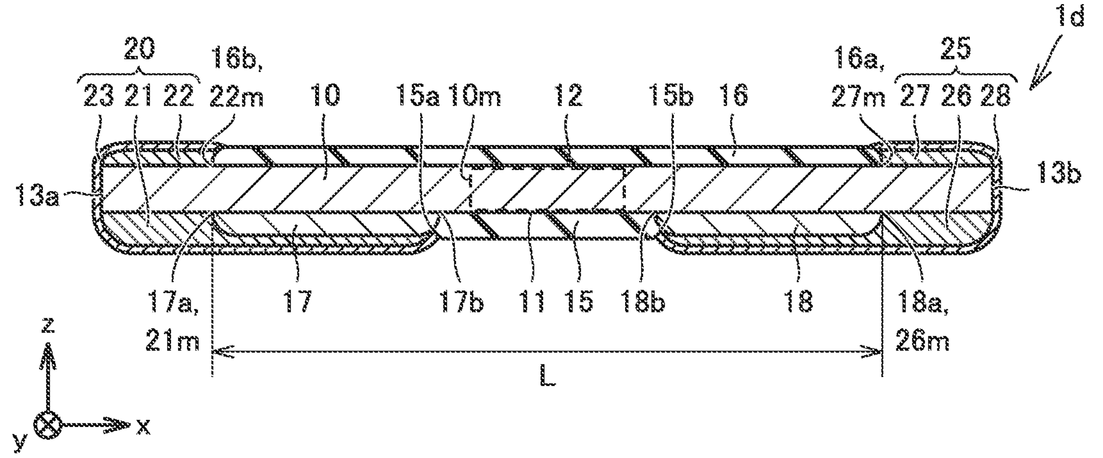
FIG. 27 is a schematic cross-sectional view along a section line XXVII-XXVII shown in FIG. 26, of the chip resistor in the fourth embodiment.

A chip resistor 1*d* in a fourth embodiment will be described with reference to FIGS. 26 and 27. Though chip resistor 1*d* in the present embodiment is similar in configuration to chip resistor 1 in the first embodiment, it is different in aspects below.

First insulating layer 15 is provided also on first conductive underlying layer 17. First end 15*a* of first insulating layer 15 is exposed from first conductive underlying layer 17. End 17*b* of first conductive underlying layer 17 is covered with first insulating layer 15. End 17*b* of first conductive underlying layer 17 is distant from first electrode layer 21. First insulating layer 15 is provided also on second conductive underlying layer 18. Second end 15*b* of first insulating layer 15 is exposed from second conductive underlying layer 18. End 18*b* of second conductive underlying layer 18 is covered with first insulating layer 15. End 18*b* of second conductive underlying layer 18 is distant from second electrode layer 26.

A method of manufacturing chip resistor 1*d* in the present embodiment will be described with reference to FIGS. 4, 6, 9, 11, 13, and 28 to 32. Though the method of manufacturing chip resistor 1*d* in the present embodiment includes steps similar to those in the method of manufacturing chip resistor 1 in the first embodiment, it is different mainly in aspects below.

Figure 28:
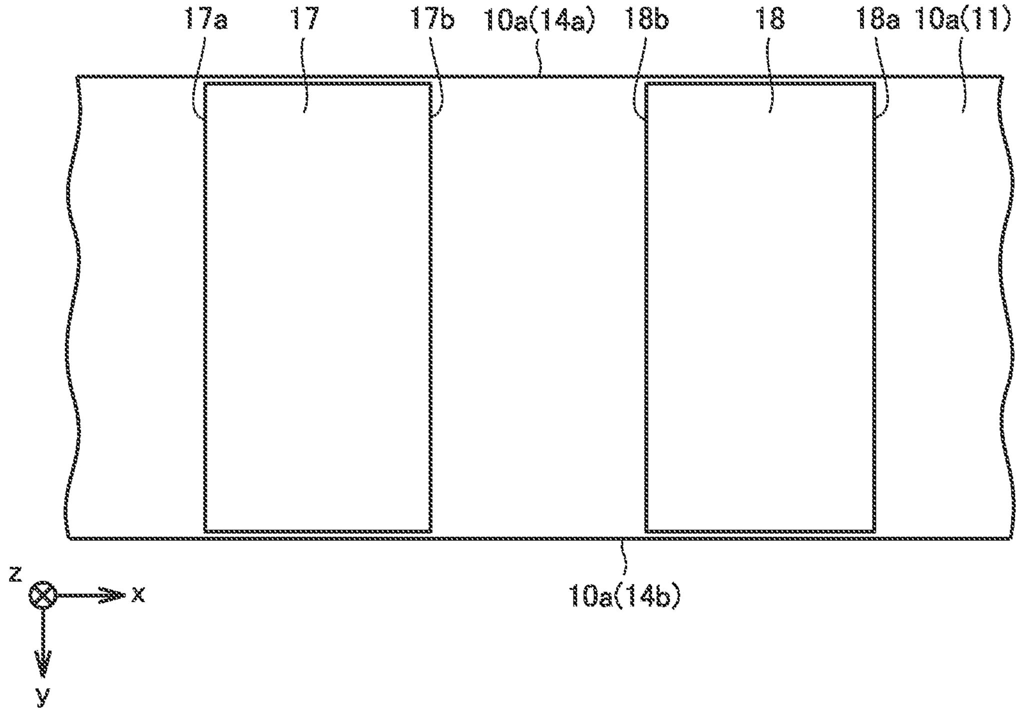
FIG. 28 is a schematic plan view showing a step following the step shown in FIG. 4 in the method of manufacturing a chip resistor in the fourth embodiment.

The method of manufacturing chip resistor 1*d* in the present embodiment includes the step shown in FIG. 4. Referring to FIG. 28, the method of manufacturing chip resistor 1*d* in the present embodiment includes forming first conductive underlying layer 17 and second conductive underlying layer 18 on first main surface 11 of band-shaped resistive element 10*a*. First conductive underlying layer 17 and second conductive underlying layer 18 are distant from each other in the first direction (the x direction).

First conductive underlying layer 17 includes end 17*a* which is an end of first conductive underlying layer 17 in the first direction (the x direction) and end 17*b* which is an end of first conductive underlying layer 17 in the first direction (the x direction) and opposite to end 17*a*. Second conductive underlying layer 18 includes end 18*a* which is an end of second conductive underlying layer 18 in the first direction (the x direction) and end 18*b* which is an end of second conductive underlying layer 18 in the first direction (the x direction) and opposite to end 18*a*. End 17*b* of first conductive underlying layer 17 is opposed to end 18*b* of second conductive underlying layer 18. First conductive underlying layer 17 and second conductive underlying layer 18 are provided, for example, by printing such as screen printing.

Figure 29:
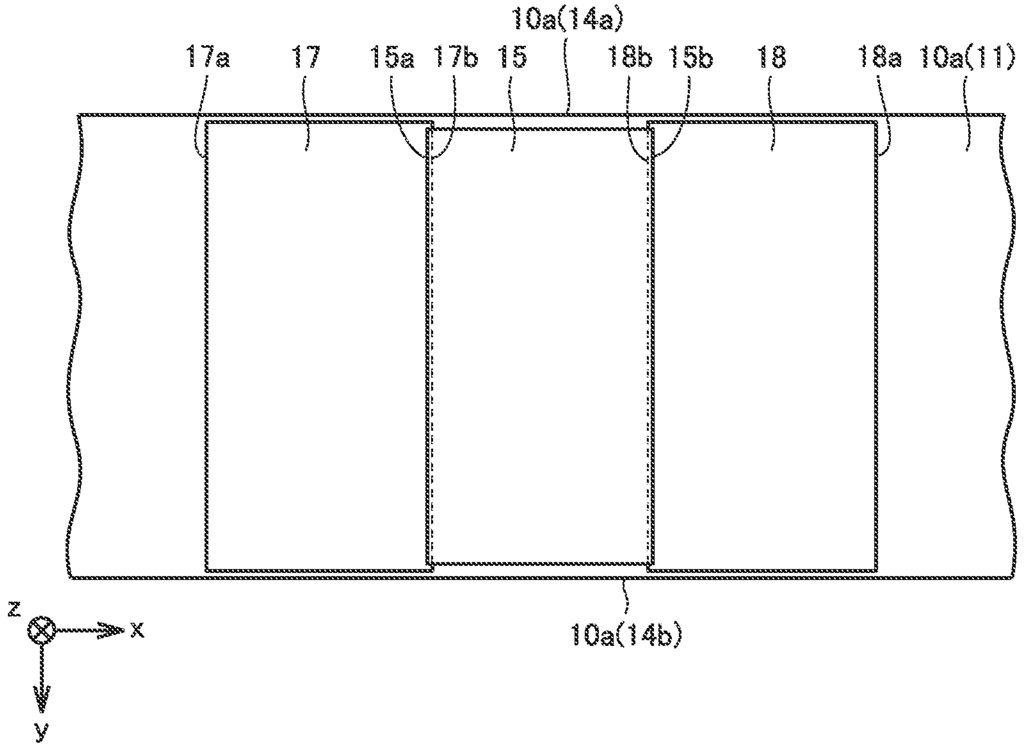
FIG. 29 is a schematic bottom view showing a step following the step shown in FIG. 28 in the method of manufacturing a chip resistor in the fourth embodiment.

Referring to FIGS. 6 and 29, the method of manufacturing chip resistor 1*d* in the present embodiment includes forming first insulating layer 15 on first main surface 11 of band-shaped resistive element 10*a*, first conductive underlying layer 17, and second conductive underlying layer 18 and forming second insulating layer 16 on second main surface 12 of band-shaped resistive element 10*a*. First insulating layer 15 is formed between first conductive underlying layer 17 and second conductive underlying layer 18. End 17*b* of first conductive underlying layer 17 is covered with first insulating layer 15. End 18*b* of second conductive underlying layer 18 is covered with first insulating layer 15.

First insulating layer 15 includes first end 15*a* which is an end of first insulating layer 15 in the first direction (the x direction) and second end 15*b* which is an end of first insulating layer 15 in the first direction (the x direction) and opposite to first end 15*a*. First end 15*a* of first insulating layer 15 is located on first conductive underlying layer 17 and covers end 17*b* of first conductive underlying layer 17. Second end 15*b* of first insulating layer 15 is located on second conductive underlying layer 18 and covers end 18*b* of second conductive underlying layer 18. Second insulating layer 16 includes third end 16*a* which is an end of second insulating layer 16 in the first direction (the x direction) and fourth end 16*b* which is an end of second insulating layer 16 in the first direction (the x direction) and opposite to third end 16*a*.

Figure 30:
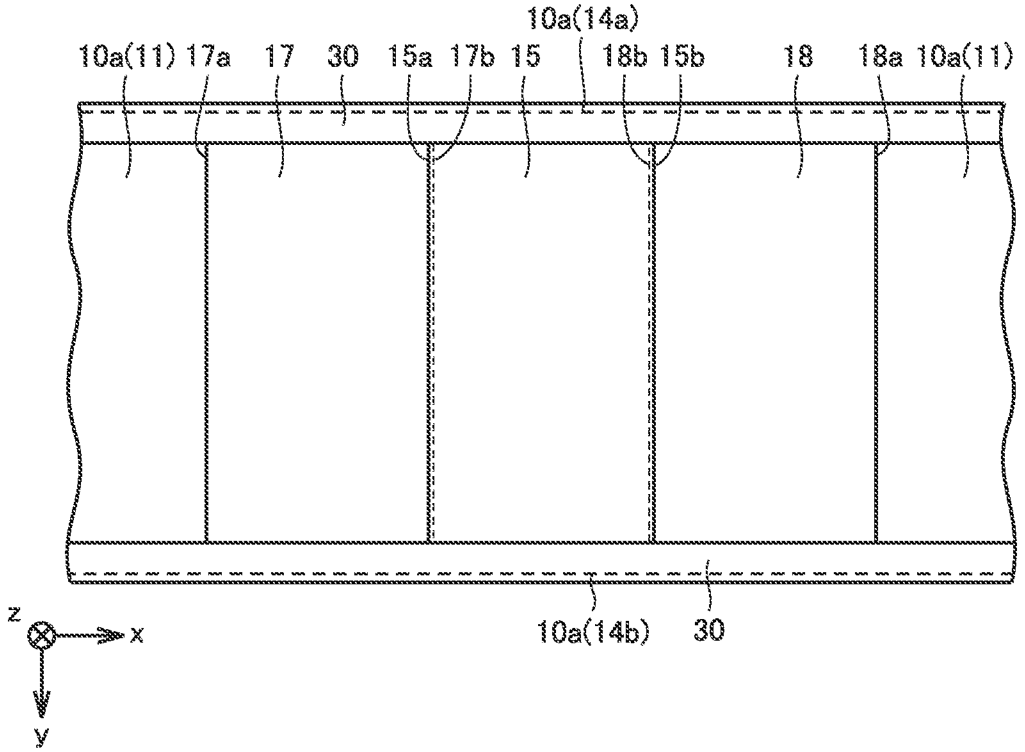
FIG. 30 is a schematic bottom view showing a step following the steps shown in FIGS. 6 and 29 in the method of manufacturing a chip resistor in the fourth embodiment.
Figure 31:
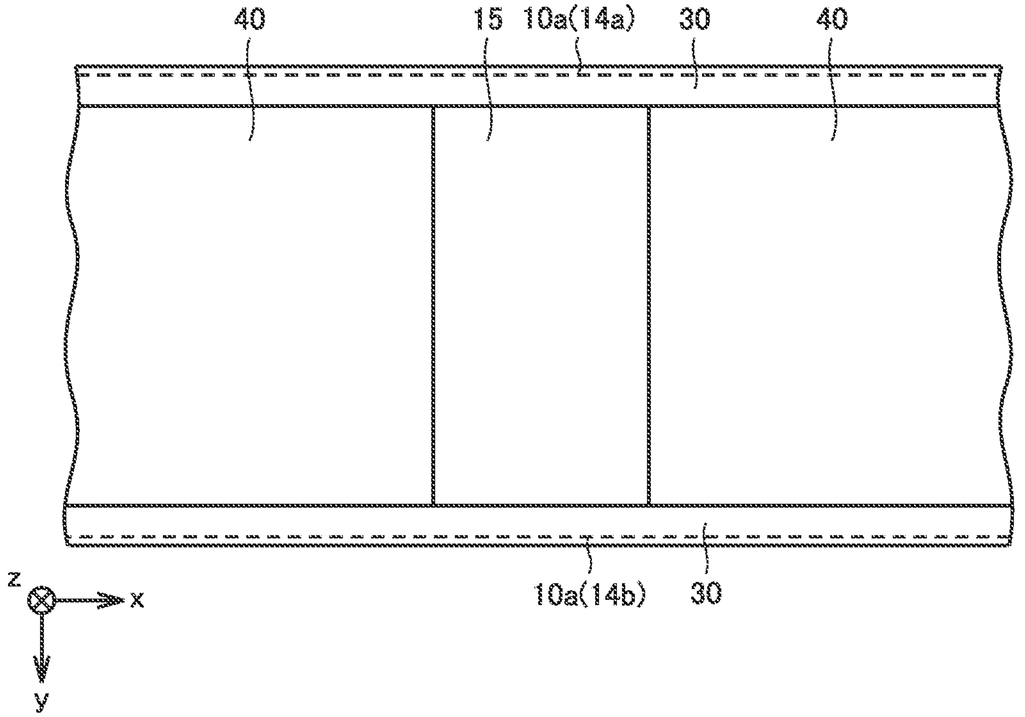
FIG. 31 is a schematic bottom view showing a step following the steps shown in FIGS. 9 and 30 in the method of manufacturing a chip resistor in the fourth embodiment.
Figure 32:
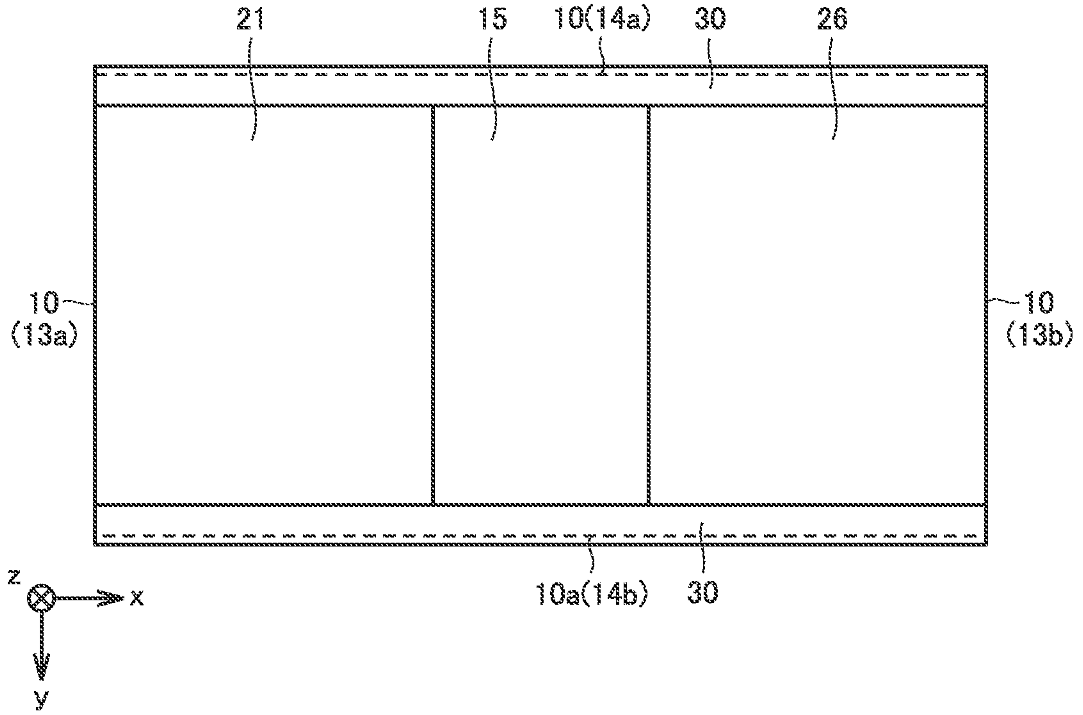
FIG. 32 is a schematic bottom view showing a step following the steps shown in FIGS. 11 and 31 in the method of manufacturing a chip resistor in the fourth embodiment.

Referring to FIGS. 9 and 30, the method of manufacturing chip resistor 1*d* in the present embodiment includes forming insulating coating film 30 similarly to the method of manufacturing chip resistor 1 in the first embodiment. Referring to FIGS. 11 and 31, the method of manufacturing chip resistor 1*d* in the present embodiment includes forming first conductive film 40 and second conductive film 41 similarly to the method of manufacturing chip resistor 1 in the first embodiment. Referring to FIGS. 13 and 32, the method of manufacturing chip resistor 1*d* in the present embodiment includes dividing band-shaped resistive element 10*a* to form resistive element 10 including first side surface 13*a* and second side surface 13*b* similarly to the method of manufacturing chip resistor 1 in the first embodiment. The method of manufacturing chip resistor 1*d* in the present embodiment includes forming first thin metal layer 23 and second thin metal layer 28 similarly to the method of manufacturing chip resistor 1 in the first embodiment. Chip resistor 1*d* shown in FIGS. 26 and 27 is thus obtained.

Chip resistor 1*d* in the present embodiment achieves effects below similar to those of chip resistor 1 in the first embodiment.

In chip resistor 1*d* in the present embodiment, resistive element 10 includes central portion 10*m* exposed from first electrode 20 and second electrode 25 in the plan view of first main surface 11. End 17*b* of first conductive underlying layer 17 proximate to central portion 10*m* of resistive element 10 is covered with first insulating layer 15. End 18*b* of second conductive underlying layer 18 proximate to central portion 10*m* of resistive element 10 is covered with first insulating layer 15. Chip resistor 1*d* in the present embodiment can achieve improved heat radiation performance independently of the resistance value thereof.

It should be understood that the first to fourth embodiments disclosed herein are illustrative and non-restrictive in every respect. At least two of the first to fourth embodiments disclosed herein may be combined unless there is inconsistency. For example, third conductive underlying layer 33 and third insulating layer 35 in the second embodiment may be provided in chip resistor 1*d* in the fourth embodiment.

Third conductive underlying layer 33, fourth conductive underlying layer 34, and third insulating layer 35 in the third embodiment may be provided in chip resistor 1*d* in the fourth embodiment. The scope of the present disclosure is defined by the terms of the claims rather than the description above and is intended to include any modifications within the scope and meaning equivalent to the terms of the claims.

REFERENCE SIGNS LIST

1, 1*b*, 1*c*, 1*d* chip resistor; 5 resistive element frame; 10 resistive element; 10*a* band-shaped resistive element; 10*m* central portion; 11 first main surface; 12 second main surface; 13*a* first side surface; 13*b* second side surface; 14*a* third side surface; 14*b* fourth side surface; 15 first insulating layer; 15*a* first end; 15*b* second end; 16 second insulating layer; 16*a* third end; 16*b* fourth end; 17 first conductive underlying layer; 17*a*, 17*b* end; 18 second conductive underlying layer; 18*a*, 18*b* end; 20 first electrode; 21 first electrode layer; 21*m* first portion; 22 third electrode layer; 22*m* third portion; 23 first thin metal layer; 25 second electrode; 26 second electrode layer; 26*m* second portion; 27 fourth electrode layer; 27*m* fourth portion; 28 second thin metal layer; 30 insulating coating film; 33 third conductive underlying layer; 33*a* end; 34 fourth conductive underlying layer; 34*a* end; 35 third insulating layer; 40 first conductive film; 41 second conductive film; 50 circuit board; 51 insulating substrate; 52, 53 conductive wire; 54, 55 bonding member

The invention claimed is:

1. A chip resistor comprising:

a resistive element including a first main surface, a second main surface opposite to the first main surface, a first side surface connected to the first main surface and the second main surface, and a second side surface opposite to the first side surface, the second side surface being connected to the first main surface and the second main surface;

a first conductive underlying layer provided on the first main surface;

a second conductive underlying layer provided on the first main surface, the second conductive underlying layer being distant from the first conductive underlying layer;

a first electrode provided on a first side surface side of the resistive element, the first electrode being distant from the second conductive underlying layer;

a first insulating layer provided on the first main surface; and a second electrode provided on a second side surface side of the resistive element, the second electrode being distant from the first conductive underlying layer and the first electrode, wherein the first electrode includes a first electrode layer provided on the first main surface and the first conductive underlying layer, the second electrode includes a second electrode layer provided on the first main surface and the second conductive underlying layer, a first electrical resistivity of the first conductive underlying layer is higher than a second electrical resistivity of the first electrode layer and higher than a third electrical resistivity of the resistive element, a fourth electrical resistivity of the second conductive underlying layer is higher than a fifth electrical resistivity of the second electrode layer and higher than the third electrical resistivity of the resistive element, the first insulating layer is arranged between the first electrode and the second electrode and between the first conductive underlying layer and the second conductive underlying layer, the resistive element includes a central portion exposed from the first electrode and the second electrode in a plan view of the first main surface, an end of the first conductive underlying layer proximate to the central portion is covered with the first insulating layer, and an end of the second conductive underlying layer proximate to the central portion is covered with the first insulating layer.

2. The chip resistor according to claim 1, wherein the first conductive underlying layer and the second conductive underlying layer are formed of a conductive resin containing a binder resin and conductive particles dispersed in the binder resin, and the first electrode layer and the second electrode layer are formed of a metal.

3. The chip resistor according to claim 1, wherein a first end of the first insulating layer proximate to the first side surface is covered with the first conductive underlying layer, and a second end of the first insulating layer proximate to the second side surface is covered with the second conductive underlying layer.

4. The chip resistor according to claim 1, wherein the first electrode further includes a third electrode layer and a first thin metal layer, the third electrode layer is provided on the second main surface, and the first thin metal layer electrically connects the first electrode layer and the third electrode layer to each other, and the second electrode further includes a fourth electrode layer and a second thin metal layer, the fourth electrode layer is provided on the second main surface and distant from the third electrode layer, and the second thin metal layer electrically connects the second electrode layer and the fourth electrode layer to each other.

5. The chip resistor according to claim 4, wherein the resistive element includes a central portion exposed from the first electrode and the second electrode in a plan view of the first main surface, a first portion of the first electrode layer that is in contact with the resistive element and most proximate to the central portion of the resistive element is more proximate to the central portion of the resistive element than a third portion of the third electrode layer that is in contact with the resistive element and most proximate to the central portion of the resistive element, or is flush with the third portion of the third electrode layer, and a second portion of the second electrode layer that is in contact with the resistive element and most proximate to the central portion of the resistive element is more proximate to the central portion of the resistive element than a fourth portion of the fourth electrode layer that is in contact with the resistive element and most proximate to the central portion of the resistive element, or is flush with the fourth portion of the fourth electrode layer.

6. The chip resistor according to claim 4, further comprising a second insulating layer provided on the second main surface, wherein the second insulating layer is arranged between the third electrode layer and the fourth electrode layer.

7. The chip resistor according to claim 1, wherein the chip resistor is a shunt resistor.

8. A chip resistor comprising:

a resistive element including a first main surface, a second main surface opposite to the first main surface, a first side surface connected to the first main surface and the second main surface, and a second side surface opposite to the first side surface, the second side surface being connected to the first main surface and the second main surface;

a first conductive underlying layer provided on the first main surface;

a second conductive underlying layer provided on the first main surface, the second conductive underlying layer being distant from the first conductive underlying layer;

a first electrode provided on a first side surface side of the resistive element, the first electrode being distant from the second conductive underlying layer; and a second electrode provided on a second side surface side of the resistive element, the second electrode being distant from the first conductive underlying layer and the first electrode, wherein the first electrode includes a first electrode layer provided on the first main surface and the first conductive underlying layer, the second electrode includes a second electrode layer provided on the first main surface and the second conductive underlying layer, a first electrical resistivity of the first conductive underlying layer is higher than a second electrical resistivity of the first electrode layer and higher than a third electrical resistivity of the resistive element, a fourth electrical resistivity of the second conductive underlying layer is higher than a fifth electrical resistivity of the second electrode layer and higher than the third electrical resistivity of the resistive element, the first electrode further includes a third electrode layer and a first thin metal layer, the third electrode layer is provided on the second main surface, and the first thin metal layer electrically connects the first electrode layer and the third electrode layer to each other, the second electrode further includes a fourth electrode layer and a second thin metal layer, the fourth electrode layer is provided on the second main surface and distant from the third electrode layer, and the second thin metal layer electrically connects the second electrode layer and the fourth electrode layer to each other, an insulating layer is provided on the second main surface and arranged between the third electrode layer and the fourth electrode layer, a third conductive underlying layer is provided on the second main surface and the insulating layer, the third conductive underlying layer is in contact with the fourth electrode layer and distant from the third electrode layer, a third end of the insulating layer proximate to the second side surface is covered with the third conductive underlying layer, and a sixth electrical resistivity of the third conductive underlying layer is higher than a seventh electrical resistivity of the fourth electrode layer and higher than the third electrical resistivity of the resistive element.

9. The chip resistor according to claim 8, wherein in a plan view of the second main surface, the third conductive underlying layer overlaps with the central portion of the resistive element in a direction in which the first electrode and the second electrode are distant from each other.

10. The chip resistor according to claim 8, wherein the third conductive underlying layer is formed of a conductive resin containing a binder resin and conductive particles dispersed in the binder resin, and the fourth electrode layer is formed of a metal.

11. The chip resistor according to claim 8, further comprising a fourth conductive underlying layer provided on the second main surface and the insulating layer, wherein the fourth conductive underlying layer is in contact with the third electrode layer and distant from the third conductive underlying layer and the fourth electrode layer, a fourth end of the insulating layer proximate to the first side surface is covered with the fourth conductive underlying layer, and an eighth electrical resistivity of the fourth conductive underlying layer is higher than a ninth electrical resistivity of the third electrode layer and higher than the third electrical resistivity of the resistive element.

12. The chip resistor according to claim 11, wherein the fourth conductive underlying layer is formed of a conductive resin containing a binder resin and conductive particles dispersed in the binder resin, and the third electrode layer is formed of a metal.

13. A method of manufacturing a chip resistor comprising:

forming on a first main surface of a band-shaped resistive element, a first conductive underlying layer and a second conductive underlying layer distant from the first conductive underlying layer;

forming a first conductive film on the first conductive underlying layer, the second conductive underlying layer, and a portion of the first main surface exposed from the first conductive underlying layer and the second conductive underlying layer; and dividing the band-shaped resistive element to form a resistive element including a first side surface and a second side surface;

forming an insulating layer on a second main surface of the band-shaped resistive element opposite to the first main surface;

forming a third conductive underlying layer on the second main surface and the insulating layer;

forming a second conductive film on the third conductive underlying layer and a portion of the second main surface exposed from the third conductive underlying layer; and forming a first thin metal layer and a second thin metal layer, wherein as a result of division of the band-shaped resistive element, the first conductive film is divided into a first electrode layer proximate to the first side surface and a second electrode layer proximate to the second side surface and distant from the first electrode layer, a first electrical resistivity of the first conductive underlying layer is higher than a second electrical resistivity of the first electrode layer and higher than a third electrical resistivity of the resistive element, a fourth electrical resistivity of the second conductive underlying layer is higher than a fifth electrical resistivity of the second electrode layer and the third electrical resistivity of the resistive element, as a result of division of the band-shaped resistive element, the second conductive film is divided into a third electrode layer proximate to the first side surface and a fourth electrode layer proximate to the second side surface and distant from the third electrode layer, the third conductive underlying layer is in contact with the fourth electrode layer and distant from the third electrode layer, the first thin metal layer electrically connects the first electrode layer and the third electrode layer to each other, the second thin metal layer electrically connects the second electrode layer and the fourth electrode layer to each other, and a sixth electrical resistivity of the third conductive underlying layer is higher than a seventh electrical resistivity of the fourth electrode layer and higher than the third electrical resistivity of the resistive element.

14. The method of manufacturing a chip resistor according to claim 13, wherein the first conductive underlying layer and the second conductive underlying layer are provided by printing, and the first conductive film is provided by plating.

15. The method of manufacturing a chip resistor according to claim 13, wherein the third conductive underlying layer is provided by printing, and the second conductive film is provided by plating.

16. The method of manufacturing a chip resistor according to claim 13, further comprising forming on the second main surface and the insulating layer, a fourth conductive underlying layer distant from the third conductive underlying layer, wherein the second conductive film is formed also on the fourth conductive underlying layer, the fourth conductive underlying layer is in contact with the third electrode layer and distant from the fourth electrode layer, and an eighth electrical resistivity of the fourth conductive underlying layer is higher than a ninth electrical resistivity of the third electrode layer and higher than the third electrical resistivity of the resistive element.

17. The method of manufacturing a chip resistor according to claim 16, wherein the fourth conductive underlying layer is provided by printing.

* * * * *